United States Patent
Munakata

(10) Patent No.: US 6,369,328 B1
(45) Date of Patent: Apr. 9, 2002

(54) HEAT DISSIPATING DEVICE FOR TRANSMISSION LINE, TRANSMISSION LINE WITH HEAT DISSIPATING DEVICE, AND METHOD FOR FITTING HEAT DISSIPATING DEVICE TO TRANSMISSION LINE

(75) Inventor: Takeo Munakata, Tochigi (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/423,934

(22) PCT Filed: Mar. 15, 1999

(86) PCT No.: PCT/JP99/01257

§ 371 Date: Feb. 7, 2000

§ 102(e) Date: Feb. 7, 2000

(87) PCT Pub. No.: WO99/48182

PCT Pub. Date: Sep. 23, 1999

(30) Foreign Application Priority Data

Mar. 14, 1998 (JP) ............................. 10-082498

(51) Int. Cl.⁷ ................................................. H02G 7/00
(52) U.S. Cl. ..................... 174/70 A; 174/108
(58) Field of Search ..................... 174/41, 70 A, 174/108, 109

(56) References Cited

U.S. PATENT DOCUMENTS 2,430,378 A * 11/1947 Waldron et al. ............... 174/41
2,744,707 A * 5/1956 Peterson ....................... 174/41
5,606,636 A * 2/1997 Rowland et al. .......... 174/70 A
6,127,626 A * 10/2000 Haag et al. .................... 174/41

FOREIGN PATENT DOCUMENTS

| JP | 56-90314 | 7/1981 |
| JP | 57-91616 | 6/1982 |
| JP | 59-31713 | 2/1984 |
| JP | 59-216415 | 6/1984 |
| JP | 60-39307 | 3/1985 |
| JP | 61-14824 | 1/1986 |
| JP | 62-42421 | 10/1987 |

* cited by examiner

*Primary Examiner*—Dean A. Reichard
*Assistant Examiner*—Adolfo Nino
(74) *Attorney, Agent, or Firm*—Knobbe, Martens, Olson & Bear, LLP

(57) ABSTRACT

The present invention realizes an increase of the capacity of a power transmission wire without replacing an already strung aerial power transmission wire. For this purpose, a braided heat conducting wire heat dissipating belt (1) treated to blacken its surface so that a surface heat dissipation rate becomes 0.7 or more or a surface-blackened heat dissipating spiral rod is wound around an outer circumference of an already strung aerial line (2) or jumper (8) so as to increase the heat dissipation effect of the surface of the aerial line (2). Heat dissipation enables the capacity of a permissible power supply of the already existing aerial line (2) to be increased. Further, the braided heat conducting wire heat dissipating belt (1) shares the transmission function and lowers the wind noise.

48 Claims, 14 Drawing Sheets

HEAT DISSIPATING DEVICE FOR TRANSMISSION LINE, TRANSMISSION LINE WITH HEAT DISSIPATING DEVICE, AND METHOD FOR FITTING HEAT DISSIPATING DEVICE TO TRANSMISSION LINE

This application is the U.S. National Phase under 35 U.S.C. §371 of International Application PCT/JP99/01257, filed Mar. 15, 1999, which claims priority based on JP 10-82498, filed Mar. 14, 1998.

TECHNICAL FIELD

The present invention relates to a power transmission wire heat dissipator wound around an aerial power transmission wire or other power transmission wire for dissipating the heat of the power transmission wire, a power transmission wire (line) equipped with a heat dissipator, and a method for attaching a heat dissipator on a power transmission wire.

BACKGROUND ART

It is desired to increase the power transmission capacity of an aerial line (wire).

When the power transmission capacity is increased, the current flowing through the line becomes heated. Therefore, a permissible upper limit is set on the current flowing through the aerial line.

Therefore, the general method of increasing the transmission capacity of an aerial line is use of an aerial line having a larger sectional area.

In the case of an already strung aerial line, the transmission capacity is increased by replacing it with another line having a larger sectional area.

However, a line having a large sectional area becomes heavier in the weight of the line per unit length, so the amount of sagging (sag or slack) becomes larger due to the line's own weight. If the sag becomes larger, the distance to the ground etc. becomes shorter, so the towers must be made higher and must be made stronger in structure in some cases. Such replacement of towers is difficult in view of on-going operations, work, and costs in many cases. When replacing a tower with one having a higher height and greater strength or fabricating a higher and stronger tower in advance so that a power transmission wire having a larger sectional area will be able to be laid in the future, the problems of a rise of the manufacturing cost of the tower and a rise of the transmission cost are encountered. Also, when the transmission capacity is further increased, the above problem of an increase in the amount of heat generated in the aerial line is still encountered.

As one method of overcoming the problem of the increase of the sag, use has been made of aerial lines made of twisted steel-reinforced aluminum conductors (ACSR)—conductors reinforced by Invar steel wires having a small coefficient of linear expansion and known for low sag. When newly stringing an aerial line made of Invar-reinforced aluminum conductors, the problem of the height of the tower can be overcome since the sag of the ACSR aerial line is small. When trying to increase the transmission capacity of an aerial line made of Invar-reinforced aluminum conductors, however, the number of aluminum conductors has to be increased or the sectional area of the aluminum conductors has to be enlarged. The weight of the aerial line is therefore increased so an excessive load is applied to the tower, and the price of the aerial line becomes remarkably high. Accordingly, the above problem cannot be overcome just by using ACSR for the aerial line.

Further, as one method of overcoming the problem of the large heat generation explained above, use has been made of aerial lines made of thermo-resistant conductors able to withstand high temperature use. For example, if an aerial line made of steel-reinforced ultra thermo-resistant aluminum alloy conductors (UTACSR) is used, usage at a high temperature of 200° C. or more is possible. Heating, however, causes the aerial line to elongate. In particular, the increase of the sag of the aerial line at the time of a high temperature cannot be ignored. Therefore, the problem of an increase of the sag is still encountered if just using UTACSR for the aerial line.

Japanese Unexamined Patent Publication (Kokai) No. 64-81110 and Japanese Unexamined Patent Publication (Kokai) No. 64-81111 disclose a technique of covering the outer circumference of the aerial line with a mesh belt so as to prevent the accumulation of snow from causing a tubular mass of snow (snow tubes) from depositing on the outer circumference of the aerial line, increasing the weight of the aerial line, causing sag and in turn breaking the aerial line. However, the technique disclosed in Japanese Unexamined Patent Publication (Kokai) No. 64-81110 and Japanese Unexamined Patent Publication (Kokai) No. 64-81111 is a technique considering only the prevention of tubular accumulation of snow, and not a technique for increasing the transmission capacity of the aerial line. Particularly, Japanese Unexamined Patent Publication (Kokai) No. 64-81110 and Japanese Unexamined Patent Publication (Kokai) No. 64-81111 do not disclose a technique for increasing the transmission capacity of an aerial line by improving the heat dissipation characteristic of the aerial line.

Japanese Unexamined Patent Publication (Kokai) No. 48-72688 (Japanese Unexamined Patent Publication (Kokoku) No. 52-4357) discloses a technique of preventing galloping, which frequently occurs when there is uniform accumulation of ice and snow along a longitudinal direction of the windward side of an aerial line by winding an S-twist and Z-twist helical shaped body having a predetermined length around the outer circumference of the aerial line so that the S-twist and the Z-twist are arranged repeatedly or at random. However, Japanese Unexamined Patent Publication (Kokai) 48-72688 also does not disclose a technique of increasing the transmission capacity of an aerial line by improving the heat dissipation characteristic of the aerial line.

Japanese Unexamined Patent Publication (Kokai) No. 49-101876 (Japanese Examined Patent Publication (Kokai) No. 53-14146) discloses a technique of reducing the noise due to wind pressure on the aerial line by setting the outer diameter of the strands and the outer diameter of the line of a low noise line comprised of strands wound helically or cross-wise and setting the winding pitch to within a predetermined range. However, Japanese Unexamined Patent Publication (Kokai) No. 49-101876 also does not disclose a technique of increasing the transmission capacity of an aerial line by improving the heat dissipation characteristic of the aerial line.

Japanese Unexamined Patent Publication (Kokai) No. 57-98907 (Japanese Examined Patent Publication (Kokoku) No. 58-38884) discloses an aerial line reducing the corona noise of the aerial line by providing a low noise line comprised of a line around the outer circumference of which strands are wound where a plurality of unit strands formed with minute unevenness on the surface of the wound strands are arranged in close contact. However, Japanese Unexamined Patent Publication (Kokai) No. 57-98907 also does not disclose a technique of increasing the transmission capacity of an aerial line by improving the heat dissipation characteristic of the aerial line.

Japanese Unexamined Patent Publication (Kokai) No. 6-302223 discloses reducing the noise due to wind pressure and, further, reducing an AN level by providing a low noise line in which part of the outermost layer of the aerial line is made to project out. However, Japanese Unexamined Patent Publication (Kokai) No. 6-302223 also does not disclose a technique of increasing the transmission capacity of an aerial line by improving the heat dissipation characteristic of the aerial line.

DISCLOSURE OF THE INVENTION

An object of the present invention is to provide a heat dissipator to be attached on a power transmission wire in order to enable an increase of the transmission capacity without an increase of the sectional area of the power transmission wire itself.

Another object of the present invention is to provide a heat dissipator to be attached on a power transmission wire in order to enable an increase of the transmission capacity without an increase of the sectional area of the power transmission wire itself and, further, to enable prevention of accumulation of snow, reduction of noise due to wind pressure, reduction of the corona noise, and prevention of galloping.

Still another object of the present invention is to provide a power transmission wire on which the heat dissipator is attached in order to enable an increase of the transmission capacity without an increase of the sectional area of the power transmission wire itself.

Still another object of the present invention is to provide a power transmission wire on which a heat dissipator is attached in order to enable an increase of the transmission capacity without an increase of the sectional area of the power transmission wire itself and, further, to enable prevention of accumulation of snow, reduction of noise due to wind pressure, reduction of the corona noise, and prevention of galloping.

Still another object of the present invention is to provide a method of attaching such a heat dissipator on a power transmission wire.

According to a first aspect of the present invention, there is provided a heat dissipator for a power transmission wire comprised of a conductive heat dissipation member having conductivity and having a surface heat dissipation rate of 0.7 or more spirally wound around the outer circumferential surface of the power transmission wire at a predetermined winding pitch in close contact thereto.

Preferably, the conductive heat dissipation member is treated to blacken its surface and delustered.

Further preferably, the surface of the conductive heat dissipation member is treated to make it hydrophilic.

Also, preferably, the conductive heat dissipation member has a surface which is artificially or naturally aged in advance.

Preferably, the conductive heat dissipation member is produced by aluminum or an aluminum alloy.

According to the first aspect, the conductive heat dissipation member of the heat dissipator for a power transmission wire has a braided heat conducting wire heat dissipating belt comprised of heat conducting metal strands braided in the form of a mesh belt, the braided heat conducting wire heat dissipating belt being spirally wound around the outer circumferential surface of the power transmission wire at a predetermined winding pitch.

In the first aspect, preferably, the braided heat conducting wire heat dissipating belt has a winding pitch giving a center angle θ of the winding width on the circumference of the cross-section of the power transmission wire with the center of the power transmission wire defined by the following relation:

$$15° \leq \theta \leq 180°$$

In the first aspect, preferably, the winding pitch p of the braided heat conducting wire heat dissipating belt around the power transmission wire is set within the following range with respect to an outer diameter D of the power transmission wire:

$$10D \leq p \leq 30D$$

In the first aspect, preferably, a spiral rod is wound on the braided heat conducting wire heat dissipating belt wound around the outer circumferential surface of the power transmission wire in a reverse direction to the winding direction of the braided heat conducting wire heat dissipating belt to secure the winding of the braided heat conducting wire heat dissipating belt.

In the first aspect, preferably, the heat conducting metal strand of the braided heat conducting wire heat dissipating belt is a wire made of aluminum or an aluminum alloy having a diameter of 0.3 mm to 3.0 mm.

In the first aspect, preferably, a plurality of the braided heat conducting wire heat dissipating belts are wound around the outer circumferential surface of the power transmission wire in the same direction or so as to cross.

In the first aspect, preferably, an end of the braided heat conducting wire heat dissipating belt wound around the outer circumferential surface of the power transmission wire is wound around a front end of an anchor clamp to secure it.

In the first aspect, preferably, a braided heat conducting wire heat dissipating belt comprised of a heat conducting metal strand braided in the form of a mesh belt is wound around the outer circumference of a jumper at a tension support of the power transmission wire, and the end of the braided belt member is wound around the front end of a jumper connection of the anchor clamp to secure it.

According to a second form of the first aspect of the present invention, the conductive heat dissipation member of the heat dissipator for a power transmission wire has a conductive, surface-blackened heat dissipating spiral rod having a surface heat dissipation rate of 0.7 or more spirally formed in the longitudinal direction so that it can be attached on the outer circumferential surface of the power transmission wire in close contact thereto and the spiral rod is spirally wound around the outer circumferential surface of the power transmission wire at a predetermined winding pitch.

In the second form of the first aspect of the present invention, preferably, the winding pitch p of the surface-blackened heat dissipating spiral rod is set within the following range with respect to the outer diameter D of the power transmission wire:

$$10D \leq p \leq 30D$$

In the second form of the first aspect of the present invention, preferably, the surface-blackened heat dissipating spiral rod to wound around the outer circumferential surface of a jumper at the tension support of the power transmission wire.

According to a third form of the first aspect of the present invention, preferably, a conductive heat dissipation member of the heat dissipator for a power transmission wire has a surface-blackened conductive heat dissipation member which is flexible, electrically conductive, and has a surface heat dissipation rate of 0.7 or more to be attached on the outer circumferential surface of the power transmission wire in close contact thereto, and the conductive heat dissipation member is spirally wound around the outer circumferential surface of the power transmission wire at a predetermined winding pitch.

In the third form of the first aspect of the present invention, preferably, when the strand diameter of the outermost layer of the power transmission wire is dd, the outer diameter of the surface-blackened conductive heat dissipation member or the thickness of the diameter direction is DD, the pitch of the twist of the strand of the outer layer of the power transmission wire is pp, and the winding pitch of the conductive heat dissipation member around the outer circumferential surface of the power transmission wire is PP, the following relations stand:

$$0.8 \leq DD/dd \leq 2.0,$$

and $$0.8 \leq PP/pp \leq 5.0$$

In the third form of the first aspect of the present invention, preferably, when the strand diameter of the outermost layer of the power transmission wire is dd, the outer diameter of the surface-blackened conductive heat dissipation member or the thickness of the diameter direction is DD, the pitch of the twist of the strand of the outer layer of the power transmission wire is pp, and the winding pitch of the conductive heat dissipation member around the outer circumferential surface of the power transmission wire is PP, the following relations stand:

$$1.0 \leq DD/dd \leq 1.2,$$

and $$1.0 \leq PP/pp \leq 2.0$$

In the third form of the first aspect of the present invention, preferably, (1) the cross-section of the conductive heat dissipating member is circular, (2) the cross-section of the conductive heat dissipating member is a partially fan-like segment, (3) the cross-section of the conductive heat dissipating member is a hollow circle, or (4) the cross-section of the conductive heat dissipating member is a hollow oval.

In the third form of the first aspect of the present invention, preferably, a groove for suppressing the formation of drops of water is formed along the circumference of the conductive heat dissipating member having a circular cross-section.

In the third form of the first aspect of the present invention, preferably, the winding pitch p of the surface-blackened heat dissipating spiral rod around the power transmission wire is set to the following range with respect to the outer diameter D of the power transmission wire:

$$10D \leq p \leq 30D$$

In the third form of the first aspect of the present invention, preferably, the surface-blackened heat dissipating spiral rod to wound around the outer circumferential surface of the jumper at a tension support of the power transmission wire.

According to a second aspect of the present invention, there is provided a power transmission wire having a heat dissipating means comprised of a conductive heat dissipation member having conductivity and a surface heat dissipation rate of 0.7 or more spirally wound around the outer circumferential surface at a predetermined winding pitch in close contact thereto.

Preferably, the conductive heat dissipation member is treated to blacken its surface and delustered.

Further, preferably, the surface of the conductive heat dissipation member is treated to make it hydrophilic.

Further, preferably, the conductive heat dissipation member has a surface which is artificially or naturally aged in advance.

Preferably, the conductive heat dissipation member is produced from aluminum or an aluminum alloy.

Preferably, the power transmission wire is produced from any of steel-reinforced aluminum conductors (ACSR), steel-reinforced ultra thermo-resistant aluminum alloy conductors (UTACSR), Invar-reinforced super or extra thermo-resistant aluminum alloy conductors (ZTACIR or XTACIR), and galvanized steel twisted wire.

Preferably, the conductive heat dissipation member is a braided heat conducting wire heat dissipating belt comprised of a heat conducting metal strand braided in the form of a mesh belt.

Preferably, a plurality of braided heat conducting wire heat dissipating-belts are wound around the outer circumferential surface of the power transmission wire in close contact thereto in the same direction or so as to cross.

Further, preferably, the conductive heat dissipation member is a conductive, surface-blackened heat dissipating spiral rod having a surface heat dissipation rate of 0.7 or more formed spirally in the longitudinal direction so that it can be attached to the outer circumferential surface of the power transmission wire in close contact thereto.

Further, preferably, the conductive heat dissipation member is a surface-blackened conductive heat dissipation member which is flexible, electrically conductive, and has a surface heat dissipation rate of 0.7 or more to be attached on the outer circumferential surface of the power transmission wire in close contact thereto.

According to a third aspect of the present invention, there provided a method of attaching a heat dissipator on a power transmission wire comprising spirally winding a heat dissipation member having conductivity and a surface heat dissipation rate of 0.7 or more around the outer circumferential surface of an aerial line in close contact thereto at a predetermined winding pitch.

Preferably, the attachment work is carried out while transmitting power through the power transmission wire.

Preferably, the conductive heat dissipation member is produced from aluminum or an aluminum alloy.

Preferably, the conductive heat dissipation member is a braided heat conducting wire heat dissipating belt comprised of a heat conducting metal strand braided in the form of a mesh belt.

Preferably, the braided heat conducting wire heat dissipating belt has a winding pitch giving a center angle θ of the winding width on the circumference of the cross-section of the power transmission wire with the center of the power transmission wire defined by the following relation:

$$15° \leq \theta \leq 180°$$

Further, preferably, the winding pitch p of the braided heat conducting wire heat dissipating belt around the power transmission wire is set within the following range with respect to an outer diameter D of the power transmission wire:

$$10D \leq p \leq 30D$$

Further, preferably, a plurality of the braided heat conducting wire heat dissipating belts are wound around the outer circumferential surface of the power transmission wire in the same direction or so as to cross.

Further, preferably, the conductive heat dissipation member is a conductive, surface-blackened heat dissipating spiral rod having a surface heat dissipation rate of 0.7 or more spirally formed in the longitudinal direction so that it can be attached to the outer circumferential surface of the power transmission wire in close contact thereto.

Preferably, the winding pitch p of the surface-blackened heat dissipating spiral rod around the power transmission wire is set to the following range with respect to the outer diameter D of the power transmission wire:

$$10D \leq p \leq 30D$$

Further, preferably, the conductive heat dissipation member is a surfaoe-blackened heat dissipating spiral rod which is flexible, electrically conductive, and has a surface heat dissipation rate of 0.7 or more to be attached at the outer circumferential surface of the power transmission wire in close contact thereto.

Preferably, when the strand diameter of the outermost layer of the power transmission wire is dd, the outer diameter of the surface-blackened conductive heat dissipation member or the thickness of the diameter direction is DD, the pitch of the twist of the strand of the outer layer of the power transmission wire is pp, and the winding pitch of the conductive heat dissipation member around the outer circumferential surface of the power transmission wire is PP, the following relations stand:

$$0.8 \leq DD/dd \leq 2.0,$$

and $$0.8 \leq PP/pp \leq 5.0$$

Further, preferably, when the strand diameter of the outermost layer of the power transmission wire is dd, the outer diameter of the surface-blackened conductive heat dissipation member or the thickness of the diameter direction is DD, the pitch of the twist of the strand of the outer layer of the power transmission wire is pp, and the winding pitch of the conductive heat dissipation member around the outer circumferential surface of the power transmission wire is PP, the following relations stand:

$$1.0 \leq DD/dd \leq 1.2,$$

and $$1.0 \leq PP/pp \leq 2.0$$

BRIEF DESCRIPTION OF THE DRAWINGS

FIG. 8A is a view of the cross-section of a line around which one heat dissipating spiral rod illustrated in FIG. 7 is wound, while

BEST NODE FOR WORKING THE INVENTION

Preferred embodiments of the present invention will be described with reference to the related figures.

FIRST EMBODIMENT

A first embodiment of the heat dissipator for a power transmission wire, power transmission wire equipped with a heat dissipator, and method for attaching a heat dissipator to power transmission wire of the present invention will be explained below by referring to FIG. 1 to FIG. 5.

Figure 1:
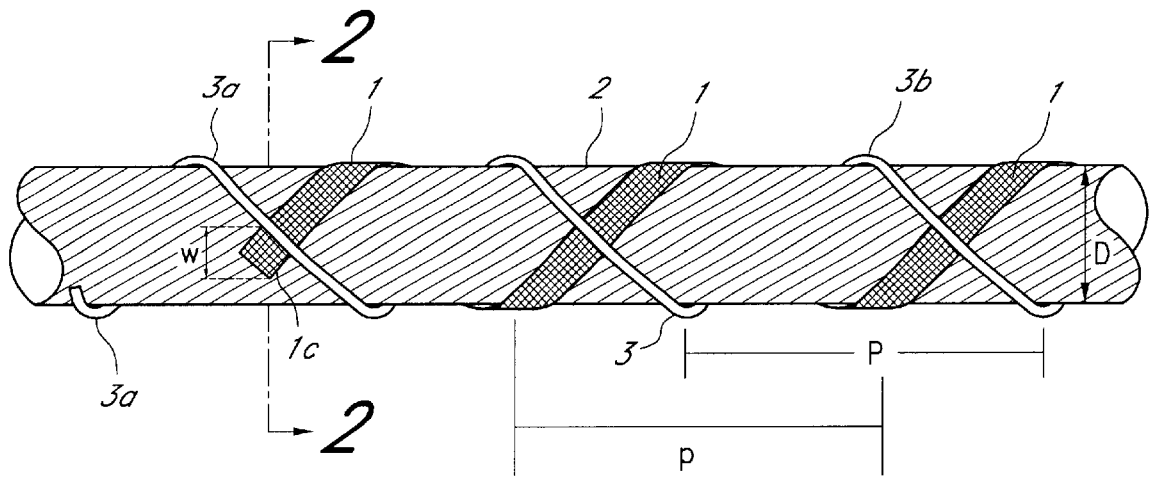
FIG. 1 is a view of the outer appearance of use of a braided heat conducting wire heat dissipating belt for an aerial line according to a first embodiment of a heat dissipator for power transmission wire and a power transmission wire equipped with a heat dissipator of the present invention.
Figure 2:
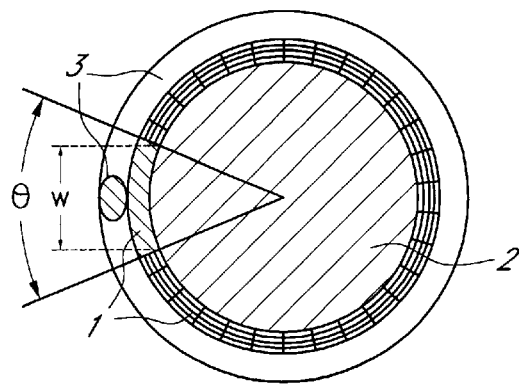
FIG. 2 is a sectional view of the aerial line and the braided heat conducting wire heat dissipating belt illustrated in FIG. 1.
Figure 3:
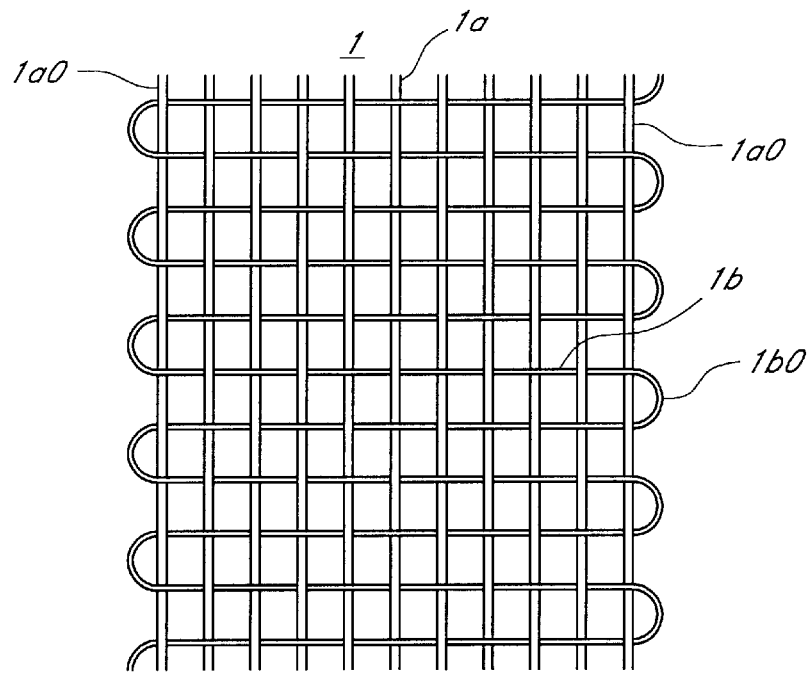
FIG. 3 is an enlarged view of a first embodiment of the braid of the braided heat conducting wire heat dissipating belt illustrated in FIG. 1.
Figure 4:
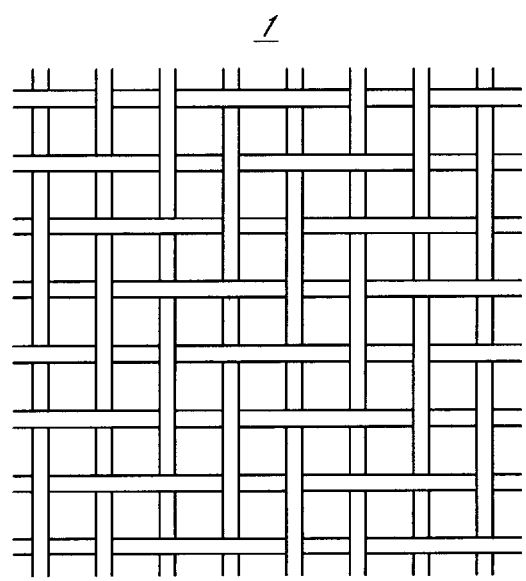
FIG. 4 is an enlarged view of a second embodiment of the braid of the braided heat conducting wire heat dissipating belt illustrated in FIG. 1.

FIG. 1 is a view of the outer appearance of the heat dissipator for a power transmission wire and the power transmission wire equipped with a heat dissipator of the first embodiment of the present invention. FIG. 2 is a sectional view of the heat dissipator for a power transmission wire and the power transmission wire equipped with a heat dissipator illustrated in FIG. 1. FIG. 3 and FIG. 4 are plan views of the braided conductive heat dissipating wire illustrated in FIG. 1.

In FIG. 1 and FIG. 2, as an example of the power transmission wire, a braided heat conducting wire heat dissipating belt 1 is spirally wound around the outer circumference of an aerial line 2 at a predetermined pitch, and a spiral rod 3 is wound around the outer circumference of the braided heat conducting wire heat dissipating belt 1 according to need in a reverse direction to the winding direction of the braided heat conducting wire heat dissipating belt 1 to suppress unraveling of the braided heat conducting wire heat dissipating belt 1 wound around the periphery of the aerial line 2. The spiral rod 3 is used as a means for preventing the unraveling of the braided heat conducting wire heat dissipating belt 1.

The aerial line 2 is an already strung aerial line obtained by twisting together naked conductors such as for example steel-reinforced aluminum conductors (ACSR), steel-reinforced ultra thermo-resistant aluminum conductors (UTACSR), Invar-reinforced super thermo-resistant aluminum conductors (ZTACIR), Invar-reinforced extra thermo-resistant aluminum conductors (XTACIR), and galvanized steel twisted wire. Namely, the first embodiment refers to the technique of increasing the transmission capacity of an already strung aerial line 2.

(1) Material of Braided Heat Conducting Wire Heat Dissipating Belt 1

Below, the conditions of the material surface required for the braided heat conducting wire heat dissipating belt 1 will be explained.

The braided heat conducting wire heat dissipating belt 1 has the role of effectively dissipating the heat of the aerial line 2 at first. Accordingly, it is necessary to produce the braided heat conducting wire heat dissipating belt 1 from a material having a good heat conductivity.

It is necessary to prevent an excessive increase of the weight of the aerial line as a whole by attaching the braided heat conducting wire heat dissipating belt 1 on the aerial line 2. Accordingly, it is desired that the braided heat conducting wire heat dissipating belt 1 be made of a light weight material.

It is desired to increase the transmission capacity of the entire aerial line by attaching the braided heat conducting wire heat dissipating belt 1 on the aerial line 2. Accordingly, it is desired that the braided heat conducting wire heat dissipating belt 1 be made of a conductive material.

The braided heat conducting wire heat dissipating belt 1 is preferably made of a material having a good processability or installability (workability) when attaching it to the aerial line 2. Further, it to desirable that it be compatible with the aerial line 2 when attaching it to the aerial line 2 to make it integral with the aerial line 2.

The braided heat conducting wire heat dissipating belt 1 is preferably made of a material having the same quality as that of the aerial line 2 or a material where the electrochemical ionization potential is not remarkably different. The reason for this is that when for example winding a braided heat dissipating belt made of a material such as copper or stainless steel on SCSR, if the electrochemical ionization potentials of the two are remarkably different, corrosion occurs due to electrolytic corrosion and the outer layer strands of ACSR are deteriorated. Note that the braided heat dissipating belt is not wound around the surface of the aerial line locally and partially, but desirably is wound continuously around the aerial line from the viewpoint of prevention of the accumulation of snow. The detailed reasons for this will be explained later.

The braided heat conducting wire heat dissipating belt 1 is used for a long period of time together with the aerial line, so preferably has a good long term durability.

The braided heat conducting wire heat dissipating belt 1 preferably has a low price.

In consideration of the above conditions, in the present embodiment, as the braided heat conducting wire heat dissipating belt 1, use was made of aluminum or an aluminum alloy. Note that the aerial line 2 is usually produced from aluminum or an aluminum alloy such as steel-reinforced aluminum conductors (ACSR) and the steel-reinforced ultra thermo-resistant aluminum conductors (UTACSR).

(2) Surface Heat Dissipation Rate of Braided Heat Conducting Wire Heat Dissipating Belt The heat dissipation rate ($\eta$) of the aerial line is a low value of about 0.08 to 0.16 in the case of a new aluminum line immediately after the installation of the aerial line, but the surface of the line is blackened along with the elapse of time and the rate finally becomes a value of about 0.9. This blackening is promoted by the application of power. The rate generally becomes about 0.7 to 0.8 in about 5 years to 7 years. Therefore, desirably the braided heat conducting wire heat dissipating belt 1 also has a high heat dissipation rate from the start. At least 0.7 is necessary. Namely, the braided heat conducting wire heat dissipating belt 1 must be treated to blacken its surface in order to raise the heat dissipation characteristic and must have a surface heat dissipation rate of 0.7 or more. Note that the heat dissipation effect is insufficient by just dying the braided heat conducting wire heat dissipating belt 1 black. There must also not be gloss on the surface.

In order to blacken the surface of the aluminum wire material of the braided strand of the braided heat conducting wire heat dissipating belt 1, for example silicic acid is effective. If calcium sulfate or zinc carbonate or zinc sulfate is added to a sodium silicate solution, the surface of the aluminum wire material can be changed to black in a certain range of concentration. Further preferably, if the surface of the aluminum wire material is sand blasted before applying the blackening treatment, a black surface having a further higher heat dissipation rate is obtained.

When a braided heat conducting wire heat dissipating belt 1 having such a heat dissipation rate is wound around the outer circumferential surface of the aerial line 2 in close contact, the heat of the aerial line 2 is effectively conducted to the braided heat conducting wire heat dissipating belt 1 and the temperature of the aerial line 2 can be lowered.

Preferably, the surface of the braided strand of the braided heat conducting wire heat dissipating belt 1 is roughened according to need, then subjected to a boehmite treatment or an alumite treatment or other electrochemical process or physical process to make it hydrophilic to prevent rain drops etc. from sticking to the surface of the aerial line as much as possible and thereby improve the corona characteristic. In other words, if rain drops etc. are formed on the surface of the aerial line, a state the same as that where numerous unevennesses are formed on the surface of the aerial line is exhibited. The potential gradient (value having absolute value equal to the field intensity, but with a reverse sign) of these projections becomes larger and the corona discharge occurs earlier, therefore the corona characteristic is degraded. When the surface of the aerial line is treated to make it hydrophilic, the contact angle of the rain drops with the surface of the aerial line becomes large and the contact angle of the surface of the aerial line becomes large, so unevenness is no longer formed on the surface of the aerial line, therefore the potential gradient of the surface of the aerial line becomes low, the corona discharge voltage becomes high, and the corona characteristic can be improved.

(3) Dimensions of Braided Heat Conducting Wire Heat Dissipating Belt

As shown in FIG. 3, the braided heat conducting wire heat dissipating belt 1 comprises heat conducting wire made of aluminum or aluminum alloy or wire to which they are applied having a thickness (diameter) of about 0.3 to 3.0 mm braided in the form of a mesh belt using a strand 1$a$ of the braid as the warp and a strand 1$b$ as the weft to form a long heat dissipating belt. For the so-called selvedge 1$a$0 of the warp at the two side edges of the braided heat conducting wire heat dissipating belt 1 in the warps 1$a$, it is possible to use a strand having a thickness different from that of the other warp strands 1$a$ for holding the shape and strength of the braided heat conducting wire heat dissipating belt 1. The selvedges 1$b$0 of the weft strand ends at the two side edges of the braided heat conducting wire heat dissipating belt 1 desirably are bent to circular curves as shown in FIG. 3 to prevent the generation of a corona.

The thickness of the braided strands of the braided heat conducting wire heat dissipating belt 1 must be from 0.3 mm to 3.0 mm as described above in view of the mechanical strength and the electrical characteristics. The work of winding the braided heat conducting wire heat dissipating belt 1 is done at the high place at which the aerial line 2 is strung between the towers, therefore in order to facilitate the winding work, the braided heat conducting wire heat dissipating belt 1 must have flexibility. Further, since it is used exposed to the outdoors for a long period of time, it is required that it not be reduced in strength due to corrosion. From this viewpoint, the thickness of the braided strand must be 0.3 mm or more. Further, when considering the fact that there may also be a case where the braided heat conducting wire heat dissipating belt 1 is wound around the aerial line 2 manually or the like, the manual winding work would become difficult if the thickness is 3.0 mm or more. Further, in view of the electrical characteristics, if there are thick projections on the surface of the aerial line 2, corona is easily generated and becomes the cause of corona noise. From the viewpoint of the mechanical strength and electrical characteristics, the range of the thickness of the braided strand should be 0.3 mm as a lower limit and 3.0 mm as an upper limit.

The size of meshes of the mesh belt braid of the braided heat conducting wire heat dissipating belt 1 is suitably selected according to the outer diameter dimension of the aerial line 2 to which it is applied.

The braid of the braided heat conducting wire heat dissipating belt 1 may be also a twill braid in which two warps and wefts each are alternately braided as shown in FIG. 4 or may be a mat braid (not illustrated) or other braid in addition to the plain weave braid shown in FIG. 3.

Space between warps and wefts: The number of the braids is expressed by the unit of "meshes" according to JIS G3555 which means the number within a 25.4 mm square. The number of stitches N is found by N=25.4/(W+d). The number of stitches N is the number of the stitches at one 25.5 mm side. W is the stitch reference dimension, that is, the space (mm) between the warps and wefts, while d indicates the reference wire diameter (mm). In the present embodiment, as explained above, d is made equal to 0.3 to 3.0 mm, but actually a range of N=7.06 to 25.4 is used, and W and d satisfying this N are found. By this, d becomes equal to 0.315 to 2.8 mm, and W becomes equal to 0.600 to 4.5 mm.

(4) Method of Attaching Braided Heat Conducting Wire Heat Dissipating Belt

In order to wind the braided heat conducting wire heat dissipating belt 1 around the aerial line 2, it is possible to use a self-propelled robot, a lashing machine, or the like to continuously wind it and thereby install it in a short time and possible to install it by without wholly stopping the power transmission of all aerial lines 2 and by stopping just line.

Note that when winding the braided heat conducting wire heat dissipating belt 1 around the aerial line 2, from the viewpoint of the prevention of the accumulation of snow, the belt is not locally and partially wound, but desirably is continuously wound. For example, in the means for preventing snow tubes disclosed in Japanese Unexamined Patent Publication (Kokai) No. 64-81110 and Japanese Unexamined Patent Publication (Kokai) No. 64-81111, the mesh-like braided aluminum wire is only wound in a direction orthogonal to the longitudinal direction of the aerial line. In particular, it is just intermittently wound, therefore there is a high possibility of the sticking snow growing into a snow tube at the parts around which the aluminum wire is not wound due to its sliding around the surface of the aerial line. Particularly, in the case of an aerial line of a type where the outer layer strands of the aerial line are formed by segment strands and when twisted together give a substantially cylindrical, so-called smooth body type with no twisted grooves, there is a tendency for snow to particularly easily accumulate. Therefore, in the first embodiment of the present invention, the braided heat conducting wire heat dissipating belt 1 is continuously helically (spirally) wound around the surface of the aerial line 2 along the longitudinal direction to thereby effectively prevent the sticking snow from sliding around the line.

(5) Relationship Between Winding Pitch P and Center Angle θ of Winding Width w

The winding pitch p of the braided heat conducting wire heat dissipating belt 1 around the aerial line 2 is set to a winding pitch, on the circumference of the cross-section of the power transmission wire shown in FIG. 2, giving an angle of the winding width w on the circumference of the aerial line 2 with the center of the aerial line 2, that is, the center angle θ, of at least 15°. Preferably, the winding pitch p is determined to give a center angle θ of the winding width defined by the following relation 1:

$$15° \leq \theta \leq 180° \tag{1}$$

When the winding pitch p is set to give a center angle θ of the winding width W of the braided heat conducting wire heat dissipating belt 1 occupied on the circumference of the cross-section of the aerial line 2 as defined by relation 1, the effect of preventing the accumulation of snow on the aerial line 2 by the braided heat conducting wire heat dissipating belt 1 to not degraded and the increase of the total weight of the line is suppressed. If the center angle θ of the winding width W of the braided heat conducting wire heat dissipating belt 1 becomes larger than 180°, the effect of promoting sloughing off of the snow becomes small, while if the center angle θ is made smaller than 15°, a conspicuous heat dissipation effect cannot be obtained.

The reason for the above will be explained in further detail below.

Since the braided heat conducting wire heat dissipating belt 1 is formed as a mesh belt, the adhered snow does not easily slough off, therefore if the braided heat conducting wire heat dissipating belt 1 is wound around the entire surface of the aerial line, the outer diameter of the line will be increased, sticking of the snow will become easier, and therefore the snow adhered to the upper portion of the line will be liable to grow into a snow tube as the line twists. When the braided heat conducting wire heat dissipating belt 1 is spirally wound around the outer circumferenoe of the aerial line 2, a separating force acts between the easily sliding snow sticking to the surfaces of the aerial line 2 exposed between the spirals and the snow sticking on the braided heat conducting wire heat dissipating belt 1. The snow sticking to the surfaces of the aerial line 2 exposed from the braided heat conducting wire heat dissipating belt 1 first sloughs off, so will not grow into an excessively large snow tube. Accordingly, from the viewpoint of the balance of the separating force, the maximum center angle of the winding width W, on the circumference of the cross-section of the aerial line 2, of the braided heat conducting wire heat dissipating belt 1 must be set to 180° or less. When the center angle θ of the winding width W becomes larger than 180°, the amount of the snow sticking to the braided heat conducting wire heat dissipating belt 1 becomes large, so the effect of promoting sloughing off of the snow is degraded. If the center angle of the winding width W of the braided heat conducting wire heat dissipating belt 1 is set to 180° or less, the increase of the weight can be suppressed to 50% or less in comparison with the case where it is wound around the entire surface of the aerial line 2.

If the center angle θ of the winding width W of the braided heat conducting wire heat dissipating belt 1 on the circumference of the cross-section of the aerial line 2 is made smaller than 15°, when assuming a case where for example the braided heat conducting wire heat dissipating belt 1 is wound around standard power transmission wire comprised of steel-reinforced aluminum conductors (ACSR) of 410 mm² area (outer diameter: 28.5 mm) as the aerial line 2, the winding width W when the center angle θ is 15° is about 3.7 mm, but this winding width W is the lowest limit when considering the reduction of the mechanical strength due to particularly the corrosion action with usage over a long period of time. If the width W of the braided heat conducting wire heat dissipating belt 1 is too small, even if it is wound around the entire outer circumferential surface of the aerial line 2, a remarkable heat dissipation effect cannot be expected.

(6) Relationship Between Winding Pitch p and Outer Diameter D of Aerial Line 2

The winding pitch p of the braided heat conducting wire heat dissipating belt 1 around the aerial line 2 is desirably set to a value defined by the following relation 2 in relation to the outer diameter D of the aerial line 2. It is economical and safe in the case of winding work utilizing a lashing machine or the like.

$$10D \leq p \leq 30D \quad (2)$$

The grounds for relation 2 will be explained. If the winding pitch p is too short, the amount of winding of the braided heat conducting wire heat dissipating belt 1 around the aerial line 2 becomes large and the weight of the line is increased, which is not preferred. Further, if the winding pitch p is short, when the braided heat conducting wire heat dissipating belt 1 is wound over the aerial line 2 by utilizing a lashing machine or the like, the installation time is greatly increased, so a lashing machine cannot be utilized. In certain cases, the belt must be installed manually, which is disadvantageous in view of economy. For these reasons, a winding pitch p of 10D or less is inconvenient and the pitch must be at least 10D.

The safety of the installation speed when a lashing machine or the like is used is ensured by setting the winding pitch p to 30D or less. Then, no sag of the braided heat conducting wire heat dissipating belt 1 wound around the aerial line 2 occurs. For example, when steel-reinforced aluminum conductors (ACSR) of 410 mm² area (outer diameter: 28.5 mm) are used for the aerial line 2 and the braided heat conducting wire heat dissipating belt 1 is wound around the ACSR, the pitch becomes 855 mm at 30D. When the outer diameter D of the aerial line 2 becomes further larger, the winding pitch p also becomes longer and the traveling speed of the winding machine also becomes faster, so the risk is increased, which is not preferred. Further, if the winding pitch p exceeds 30D, due to the sagging of the braided heat conducting wire heat dissipating belt 1, the braided heat conducting wire heat dissipating belt 1 wound at the bottom of the aerial line 2 becomes slack and separates from the surface of the aerial line 2, so the heat dissipation function of the aerial line 2 is reduced.

In order to prevent the unraveling of a winding start end 1c of the braided heat conducting wire heat dissipating belt 1 around the aerial line 2, as illustrated in FIG. 1, one or more armor rods or other spiral rods such 3a are wound upon the end 1c of the braided heat conducting wire heat dissipating belt 1 to hold the end 1c of the braided heat conducting wire heat dissipating belt 1 or another suitable fixture etc. is used to secure it.

The middle part of the braided heat conducting wire heat dissipating belt 1 wound around the aerial line 2 is held by winding one or more armor rods or other spiral rods 3b upon the braided heat conducting wire heat dissipating belt 1 at suitable intervals so that slack does not occur or another suitable fixture etc. is used to secure it.

As described above, by winding the braided heat conducting wire heat dissipating belt 1 around the surface of the outer circumference of the already strung aerial line 2 in direct close contact thereto, the heat of the surface of the power transmission wire is conducted to the braided heat conducting wire heat dissipating belt 1 of aluminum or aluminum alloy having a high heat conductivity. As illustrated in FIG. 3 and FIG. 4, the overall surface area of the braided heat conducting wire of the braided heat conducting wire heat dissipating belt 1 is extremely large, therefore the heat dissipation effect from the surface of the aerial line 2 is increased by using the aerial line 2. As a result, it becomes possible to pass a current of more than the previously permissible current through the already strung aerial line 2 and thereby increase the transmission capacity of the already strung aerial line. Further, the current also passes through the braided heat conducting wire heat dissipating belt 1 itself using the conductive aluminum, aluminum alloy, or the like, therefore the transmission capacity of the entire aerial line can be increased by the amount of the current flowing through the braided heat conducting wire heat dissipating belt 1. Namely, the braided heat conducting wire heat dissipating belt 1 itself transmits power as part of the aerial line 2 in addition to the increase of the transmission capacity of the aerial line 2 itself due to the heat dissipation of the aerial line 2.

The braided heat conducting wire heat dissipating belt 1 using the aluminum or aluminum alloy is light, therefore even if the braided heat conducting wire heat dissipating belt 1 is wound around the aerial line 2, no excessive weight is applied on the power transmission wire. Further, aluminum is highly flexible, so the attachment of the braided heat conducting wire heat dissipating belt 1 on the aerial line 2 is easy.

SECOND EMBODIMENT

A second embodiment of the heat dissipator for a power transmission wire, power transmission wire equipped with a heat dissipator, and method of attaching a heat dissipator on a power transmission wire of the present invention will be explained by referring to FIG. 5.

Figure 5:
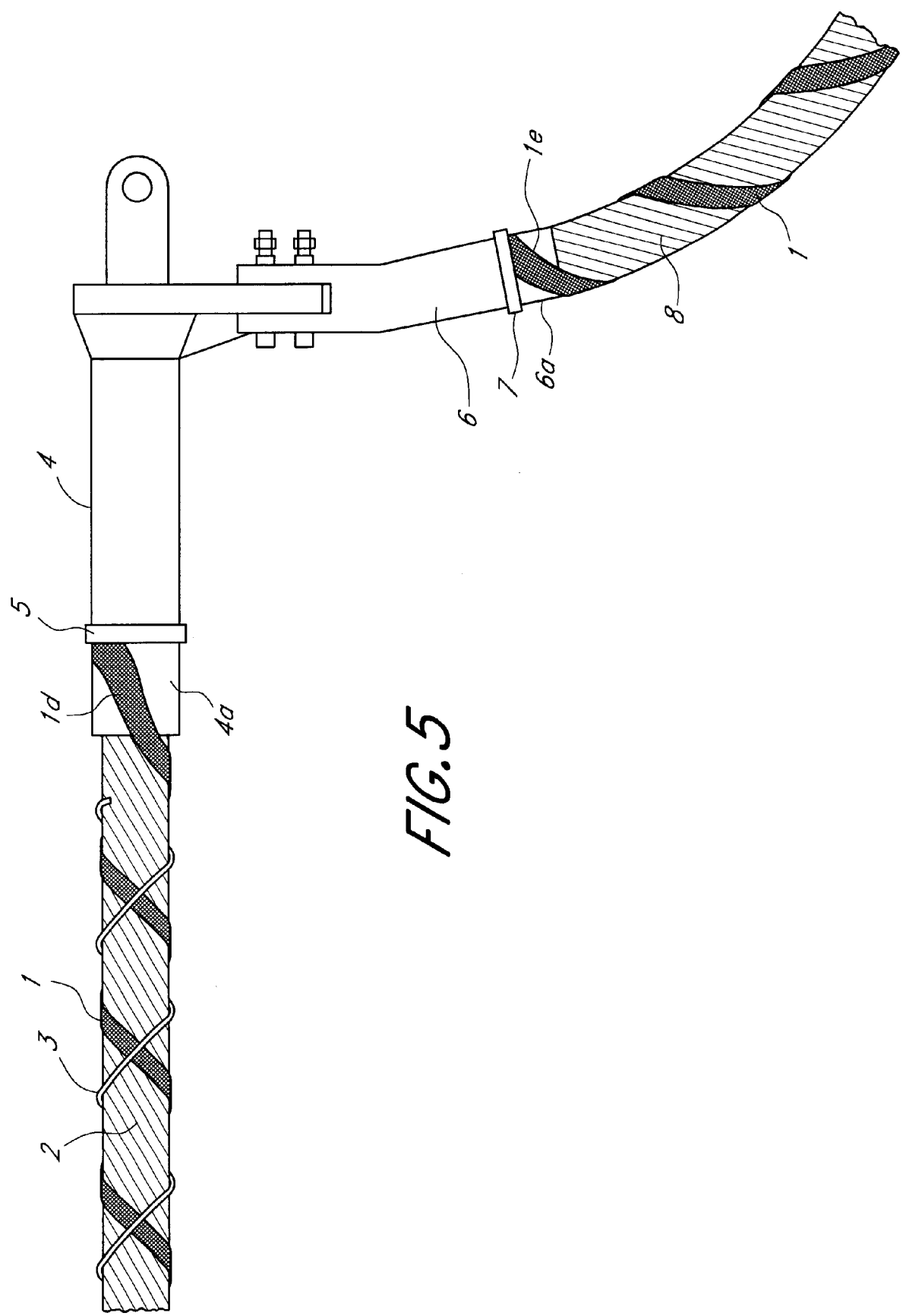
FIG. 5 is a view of the outer appearance of use of a braided heat conducting wire heat dissipating belt for an aerial line according to a second embodiment of the heat dissipator for a power transmission wire and the power transmission wire equipped with a heat dissipator of the present invention.

FIG. 5 is a view of an example of securing the end of the winding end part of the braided heat conducting wire heat dissipating belt 1 in the vicinity of an anchor clamp 4 at the tension anchor for anchoring by the anchor clamp 4 the aerial line 2 around which the braided heat conducting wire heat dissipating belt 1 is wound.

The middle part of the braided heat conducting wire heat dissipating belt 1 wound around the outer circumference of the aerial line 2 is held by winding the spiral rod 3 on the braided heat conducting wire heat dissipating belt 1. The end 1d of the braided heat conducting wire heat dissipating belt 1 is wound around the front end 4a of the anchor clamp 4 beyond the end of the aerial line 2 and secured by a securing device 5. If the braided heat conducting wire heat dissipating belt 1 is also wound around the anchor clamp 4 portion in this way, the heat dissipation of the anchor clamp 4 also becomes possible and overheating of the anchor clamp 4 can also be prevented. Note that the winding pitch of the braided heat conducting wire heat dissipating belt 1 around the anchor clamp front end 4a to preferably made smaller than the winding pitch at the surface of the aerial line 2, and that part fixed by a suitable clamp device.

In this way, by winding the spiral rod 3 upon the braided heat conducting wire heat dissipating belt 1 wound around the outer circumference of the aerial line 2 in the reverse direction to the winding direction of the braided heat conducting wire heat dissipating belt 1, the braided heat conducting wire heat dissipating belt 1 wound around the aerial line 2 is secured and unraveling of the end 1c of the winding start part of the braided heat conducting wire heat dissipating belt 1 is prevented, thus the slack of the middle part of the braided heat conducting wire heat dissipating belt 1 wound around the aerial line 2 can be prevented.

FIG. 5 shows an embodiment of suppressing a rise of the temperature of a jumper 8 by winding the braided heat conducting wire heat dissipating belt 1 around the jumper 8 at the tension support of the aerial line. By winding the braided heat conducting wire heat dissipating belt 1 around the outer circumference of the jumper 8 connected to the anchor clamp 4, the overheating of the jumper 8 is prevented, and an increase of the transmission capacity of the aerial line can be achieved. Also, overheating of the jumper connection 6 of the anchor clamp 4 is prevented by the end 1e of the braided heat dissipating belt 1 wound around the jumper 8, the end 1e being secured by the securing device 7.

Note that, in FIG. 5, only the braided heat dissipating belt 1 is wound around the jumper 8 and that the illustration of the winding of the spiral rod on the braided heat dissipating belt 1 in this case is omitted, but the spiral rod is wound around the outer circumference of the braided heat conducting wire heat dissipating belt 1 wound around the outer circumference of the jumper 8 in the reverse direction to its winding direction like the case where the braided heat conducting wire heat dissipating belt 1 is wound around the outer circumference of the aerial line 2 and then the spiral rod 3 is wound upon this in the reverse direction to the winding direction of the braided heat conducting wire heat dissipating belt 1.

The braided heat conducting wire heat dissipating belt 1 is highly flexible, so can be easily attached on the anchor clamp 4 and the jumper 8 etc. having a complex structure and also can prevent overheating of the anchor clamp 4 and the jumper 8. The braided heat conducting wire heat dissipating belt 1 using aluminum or aluminum alloy is light, so no excessive weight is applied even if it is used for the heat dissipation of the anchor clamp and the jumper.

THIRD EMBODIMENT

A third embodiment of the heat dissipator for a power transmission wire, power transmission wire equipped with a heat dissipator, and method of attaching a heat dissipator on a power transmission wire of the present invention will be explained by referring to FIG. 6.

Figure 6:
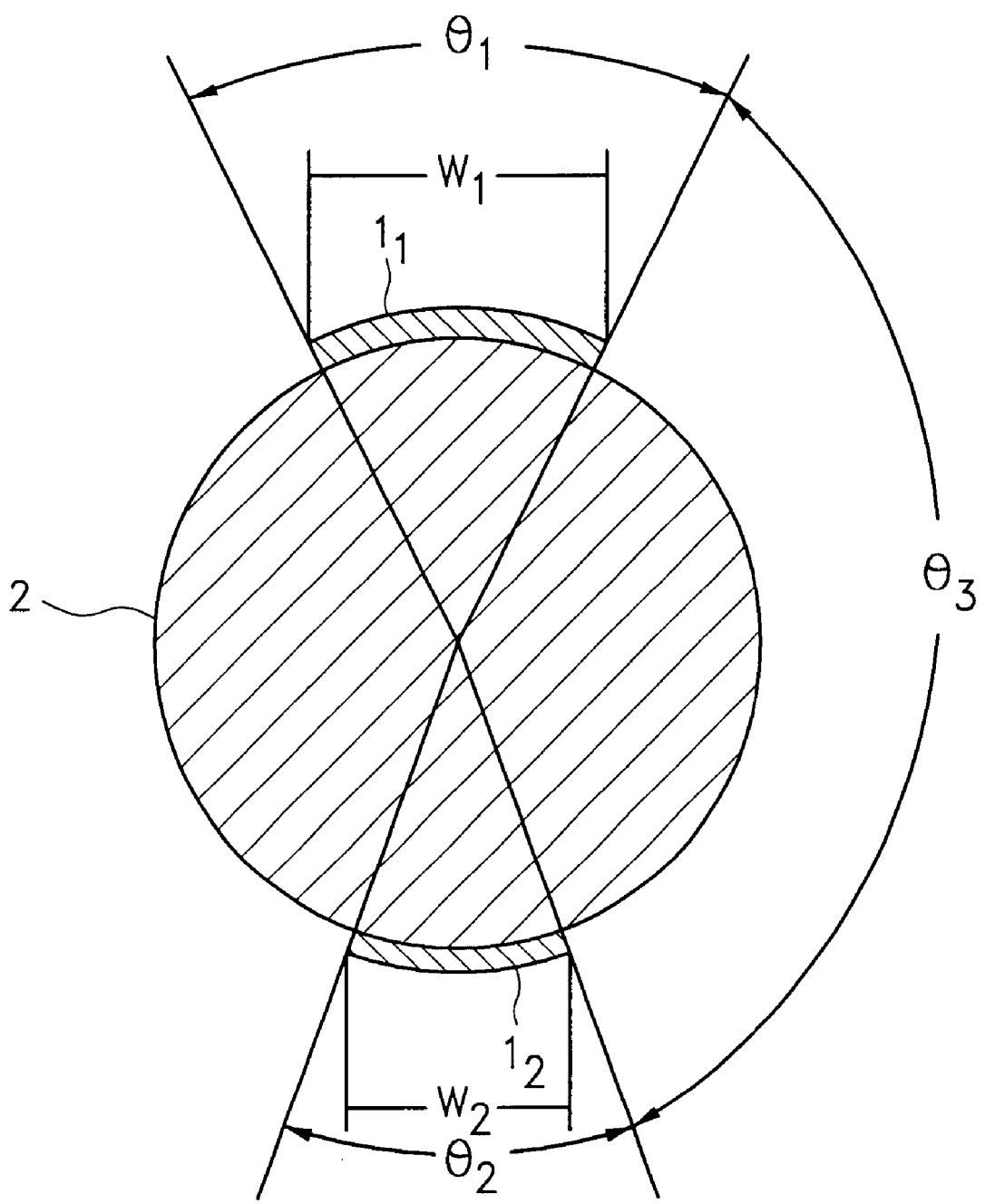
FIG. 6 is a sectional view of a third embodiment of the heat dissipator for a power transmission wire and the power transmission wire equipped with a heat dissipator of the present invention.

FIG. 6 shows the cross-section of the power transmission wire obtained by winding the braided heat conducting wire heat dissipating belt 1 around a relatively wide aerial line 2, for example the aerial line 2 having a diameter D of for example about 52.8 mm.

In the third embodiment, there is not only one braided heat conducting wire heat dissipating belt 1 wound around the outer circumference of the aerial line 2. Two braided heat conducting wire heat dissipating belts 11 and 12 are wound at opposite positions of the outer circumference of the aerial line 2 in the same direction so as to face each other on the diameter line of the aerial line 2. On the circumference of the cross-section of the aerial line 2 shown in FIG. 6, a center angle θ1 of a winding width W1 occupied on the circumference of the line of the first braided heat dissipating belt 11, a center angle θ2 of a winding width W2 occupied on the circumference of the line of the second braided heat dissipating belt 12, and a center angle θ3 of the interval between the winding widths W1 and W2 of the two belts, that is, the braided heat dissipating belt 11 and the braided heat dissipating belt 12, are selected as defined by the following relation:

$$15° \leq \theta1 \leq \theta2 \leq \theta3 \tag{3}$$

The two braided heat dissipating belts 11 and 12 to be wound around the aerial line 2 may also be wound by bringing the braided heat dissipating belts 11 and 12 in close contact with each other by setting the center angle θ3 of the interval between two lines of the braided heat dissipating belts 11 and 12 to zero. The braided heat dissipating belts 11 and 12 wound around the outer circumference of the aerial line 2 in close contact in this way, in the same way as the first embodiment explained by referring to FIG. 1 and FIG. 2, have the spiral rod 3 wound around them to hold braided heat dissipating belts 11 and 12 or they are secured by other suitable fixtures.

The winding direction of the two braided heat dissipating belts 11 and 12 around the outer circumference of the aerial line 2 may be such that the two braided heat dissipating belts 11 and 12 are wound crossing each other on the outer circumferential surface of the aerial line 2. In this case, the end of the winding start part around the aerial line 2 is secured by winding the spiral rod or holding this by another suitable fixture or the like in the same way as the first embodiment, but the middle parts of the two braided heat conducting wire heat dissipating belts 1 wound around the aerial line 2 are held by superposing the upper braided heat conducting wire heat dissipating belt over the lower braided heat conducting wire heat dissipating belt to hold it, therefore the winding of the spiral rod can be omitted, the increase of the load applied on the aerial line 2 becomes smaller, and the increase of the sag of the aerial line 2 accompanying the increase of the weight becomes smaller.

Of course, in order to more reliably hold and secure the braided heat dissipating belts 11 and 12 wound around the aerial line 2, it is also possible to wind the spiral rod upon the two braided heat dissipating belts 11 and 12 wound crossing each other.

In the first to third embodiments, an example in which one or two braided heat conducting wire heat dissipating belts 1 were wound around a single aerial line 2 was explained, but it is also possible to divide multiply arranged aerial lines into sub spans consisting of the sections between spacers securing the attached multiple lines to each other and to wind (attach) braided heat conducting wire heat dissipating belts 1 around these.

FOURTH EMBODIMENT

A fourth embodiment of the heat dissipator for a power transmission wire, power transmission wire equipped with a heat dissipator, and method of attaching a heat dissipator on a power transmission wire of the present invention will be explained by referring to FIG. 7.

Figure 7:
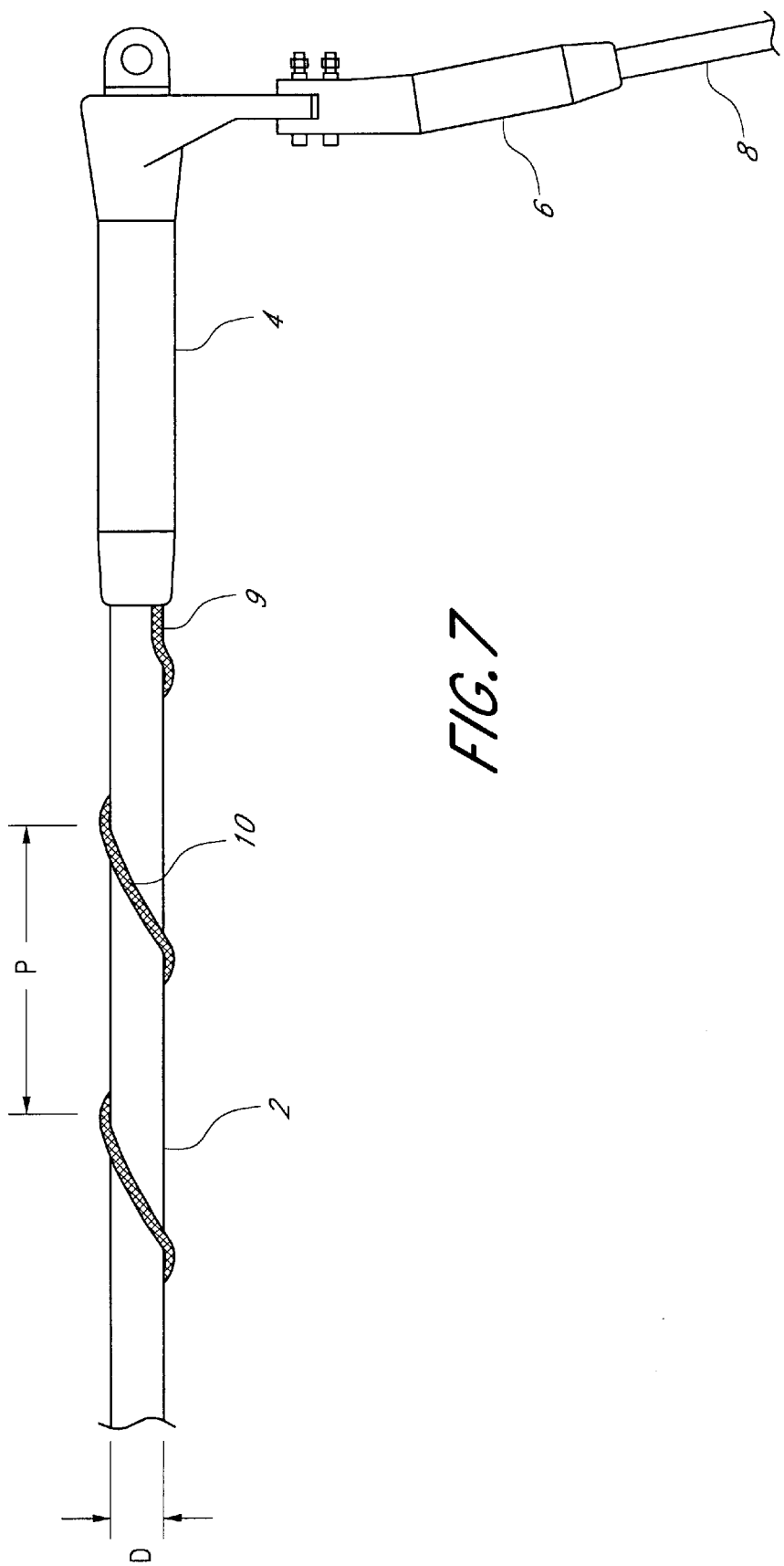
FIG. 7 is a view of the state of use of a spiral rod for an anchor clamp according to a fourth embodiment of the heat dissipator for a power transmission wire and the power transmission wire equipped with a heat dissipator of the present invention.

FIG. 7 is a view illustrating the outer appearance of a spiral rod 10 made of aluminum or aluminum alloy shaped helically in advance wound around the outer circumference of an aerial line 2 in the same way as the braided heat conducting wire heat dissipating belt 1 in place of the braided heat conducting wire heat dissipating belt 1.

The spiral rod 10 also uses aluminum or aluminum alloy satisfying the material conditions in the same way as those for the braided heat conducting wire heat dissipating belt 1, blackening treatment is applied to the surface, and the surface heat dissipation rate is set at 0.7 or more. The surface of the spiral rod 10 made of aluminum or aluminum alloy is treated to blacken it in the same way as the blackening treatment of the braided heat conducting wire heat dissipating belt 1 in the first embodiment by for example treating the surface with a sodium silicate solution containing calcium sulfate or zinc carbonate or zinc sulfate to discolor the surface black and thus obtain a black surface having a high heat dissipation rate.

Note that the spiral rod 10 can be increased in hydrophilicity of its surface by an electrochemical process or a physical process according to need to improve the corona characteristic.

One or more spiral rods 10 formed in this way are continuously wound around the outer surface of the aerial line 2 in close contact in the longitudinal direction at a twist pitch p. Other than this, the same matters considered for the braided heat conducting wire heat dissipating belt 1 are also applied to the spiral rod 10. For example, when explaining an example thereof, the surface-blackened heat dissipating spiral rod 10 is wound around the power transmission wire so that the winding pitch p becomes within the range of ($10D \leq p \leq 30D$) with respect to the outer diameter D of the aerial line 2. As explained above for the braided heat conducting wire heat dissipating belt 1, for the spiral rod 10 as well, if the winding pitch p is a too short 10D or less, the amount of winding of the spiral rod 10 becomes large, so not only to the total weight of the aerial line increased, but also the installation time is greatly increased when the winding work is carried out by utilizing a lashing machine or the like, so it becomes disadvantageous from the viewpoint of economy. Accordingly, 10D or more is required for the winding pitch p. Conversely, if the winding pitch p is a too long 30D or more, the traveling speed of the winding machine becomes fast, therefore the risk is increased, which is not preferred. The safety of the installation speed is secured by setting the winding pitch p to 30D or less.

The anchor clamp 4, jumper connection 6, and jumper 8 are similar to those explained referring to FIG. 5. Note, in the case of the spiral rod 10, it is not particularly necessary to secure the end as in the braided heat conducting wire heat dissipating belt 1, therefore the winding securing device 5 illustrated in FIG. 5 is eliminated.

In the present embodiment, the spiral rod 10 exhibits a similar effect to that by the braided heat conducting wire heat dissipating belt 1.

Figure 8A:
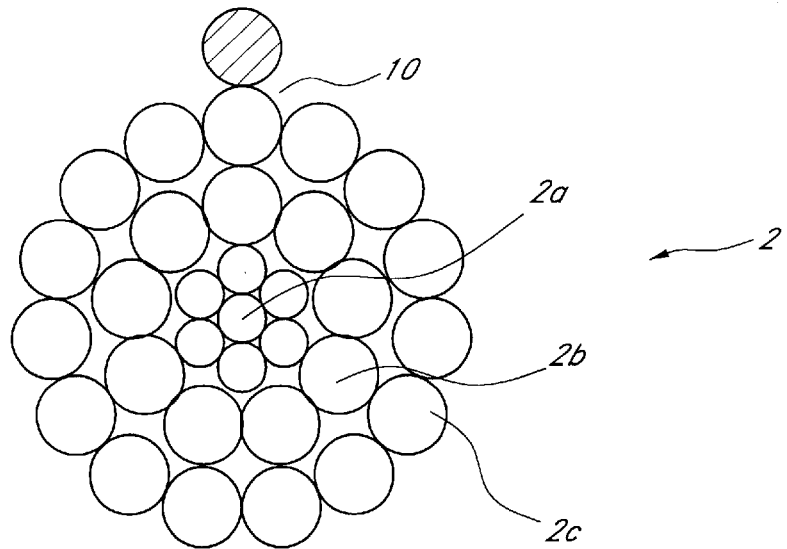
Figure 8B:
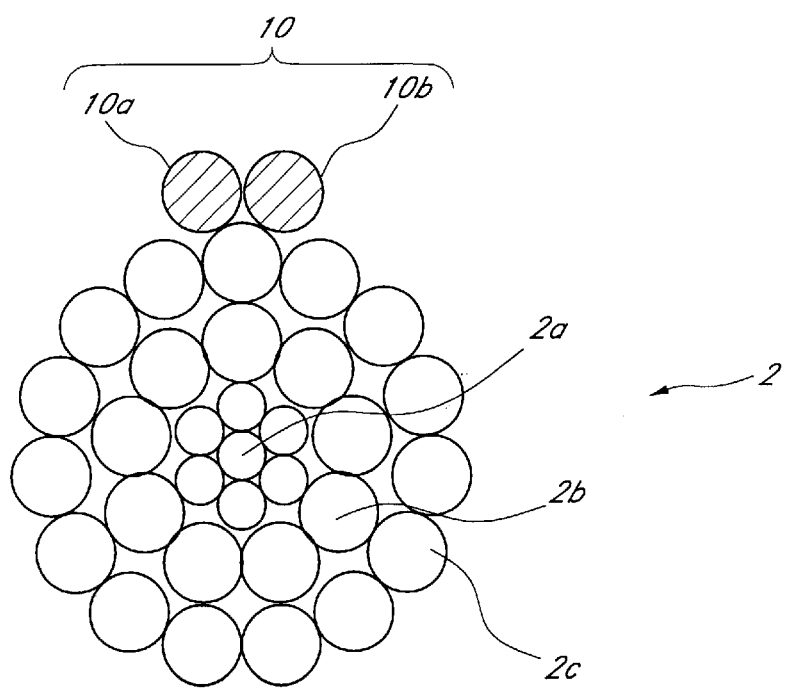
FIG. 8B is a view of the cross-section of a line around which two heat dissipating spiral rods illustrated in FIG. 7 are wound.

FIG. 8A shows an embodiment in which one surface-blackened heat dissipating spiral rod 10 is wound around the outer circumferential surface of the aerial line 2, and FIG. 8B shows an embodiment in which two heat dissipating spiral rods 10, that is, 10a and 10b, are wound aligned with each other.

The aerial line 2 illustrated in FIGS. 8A and 8B is constituted by the general structure of an aerial line, that it, a core line 2A, an intermediate layer line 2B, and an outer layer line 2C. Of course, the aerial line 2 to which the present invention is applied is not limited to a power transmission wire having the structure illustrated in FIGS. 8A and 8B and may be power transmission wires having a variety of structures.

The aerial line 2 is formed by for example steel-reinforced aluminum conductors (ACSR), steel-reinforced ultra thermo-resistant aluminum conductors (UTACSR), Invar-reinforced super or extra thermo-resistant aluminum conductors (ZTACIR or XTACIR), or galvanized steel twisted wire.

In the present embodiment as well, a surface-blackened heat dissipating spiral rod 10 can be wound around the aerial line 2 to promote the heat dissipation of the surface of the aerial line 2 and suppress the rise of the temperature of the aerial line 2. For example, when the spiral rod 10 is wound around the aerial line 2, it becomes possible to send a current more than the past permissible current through the aerial line 2 and increase the transmission capacity of an already strung aerial line. In addition, current also flows through the spiral rod 10 itself, so the transmission capacity is further increased.

Note that, as shown by the experimental examples explained later, the effect of suppressing the rise of the temperature of the line has a more conspicuous temperature reduction effect the higher the surface temperature of the aerial line.

The surface-blackened heat dissipating spiral rod 10 is shaped helically in advance, so can be easily wound around the outer circumference of the aerial line 2. For example, the spiral rod 10 can be continuously wound around an already strung aerial line 2 by a self-propelled robot, a lashing machine, or the like. At this time, it to possible to install the spiral rod 10 on aerial lines 2 in a short time by just stopping transmission over one line and not stopping the transmission over all of the aerial lines.

The spiral rod 10 made of aluminum or aluminum alloy is light, therefore even if it is wound around the aerial line 2, there is no excessive increase of the weight load and an increase of the transmission capacity can be economically realized without replacing an already strung aerial line.

Although the illustration was omitted in FIG. 7, a spiral rod 10 can also be wound around the outer circumference of the jumper 8. As a result, the heat dissipation effect of the jumper 8 is increased, and the transmission capacity of the jumper 8 can be increased.

FIRST EXPERIMENTAL EXAMPLE

An experimental example of the fourth embodiment explained above will be explained by referring to FIG. 9.

Figure 9:
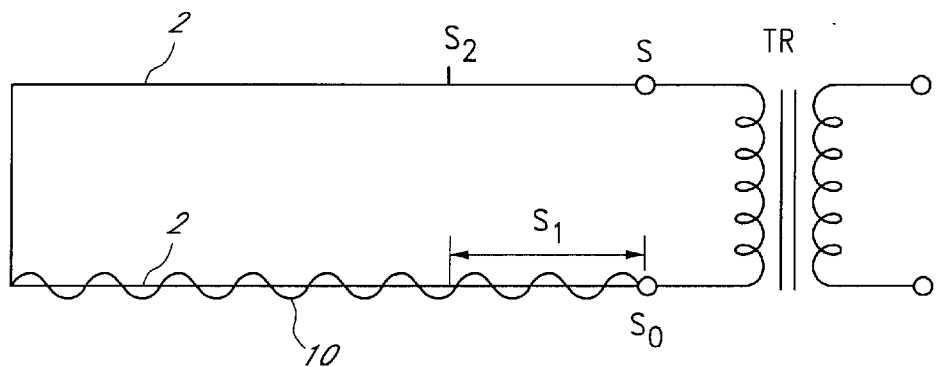
FIG. 9 is a view of the configuration of a first experimental example in the present invention.

FIG. 9 is a view of an experiment in which a constant current is passed through a part A of the aerial line 2 upon which the above-mentioned surface-blackened spiral rod 10 is laid and a part B of the aerial line 2 on which the spiral rod 10 is not laid from a transformer Tr and the surface temperature of the aerial line 2 at the part A and the surface temperature of the aerial line 2 at the part B are measured. An aerial line 2 having a length of 150 m was bent back at 75 m. A spiral rod 10 made of aluminum was wound around the aerial line 2 at the section A by the method illustrated in FIG. 7. The aerial line 2 at the section A and the aerial line 2 at the section B were laid in parallel. Steel-reinforced aluminum conductors (ACSR) were used as the aerial line 2.

The sectional area of the ACSR was 410 $mm^2$. Accordingly, the outer diameter D of the ACSR was 28.5 mm. One surface-blackened heat dissipating spiral rod 10 made of aluminum having a diameter (thickness) of 6 mm and a spiral pitch of 300 mm was continuously wound around the aerial line 2 of the ACSR in the part of the section A, i.e., 75 m.

The surface temperature differences of the line at different parts at the winding zone A and the non-winding zone B were measured and compared in the state where the current of 1500 A was passed from the transformer Tr outdoors under an environment of a wind speed of about 0.8 m/s.

Figure 10:
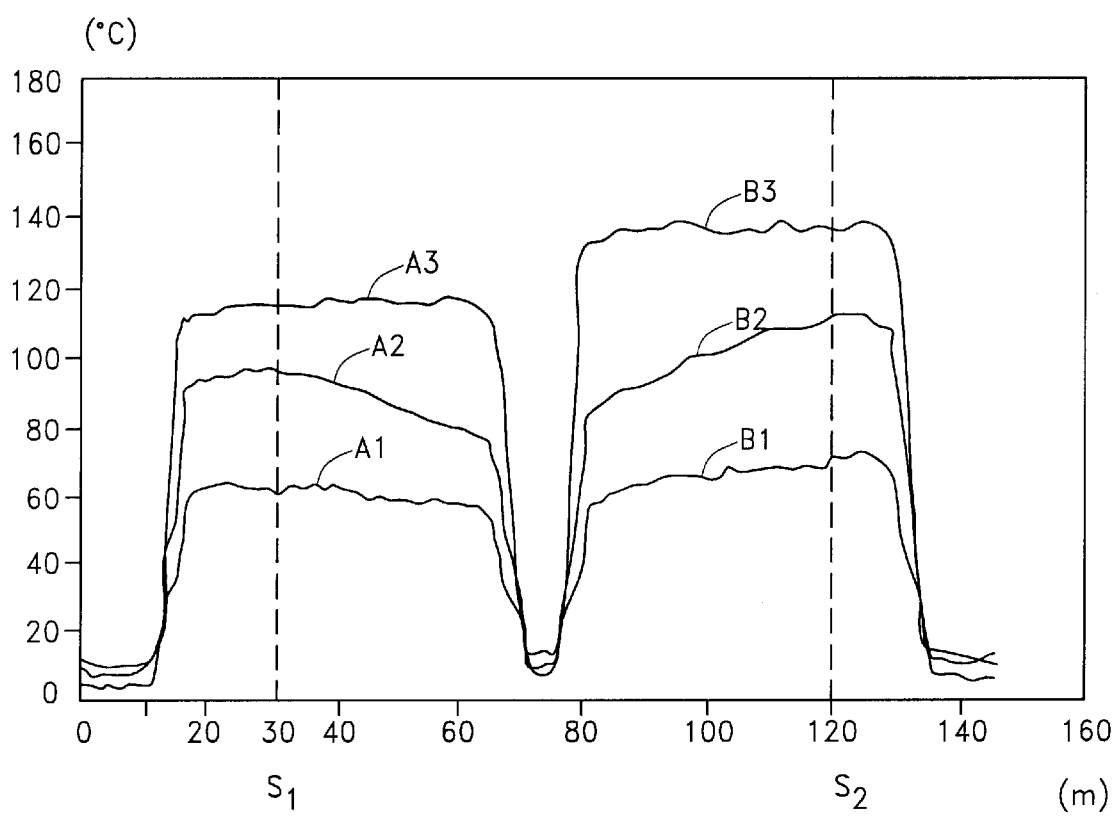
FIG. 10 is a graph of the result of the experimental example illustrated in FIG. 9.

FIG. 10 is a graph showing the result of the experiment illustrated in FIG. 9. The abscissa indicates the length (m) of the aerial line, while the ordinate indicates the surface temperature (° C.) of the aerial line. The curves A1 to A3 indicate the surface temperatures of the aerial line at the section A with respect to the length direction, and while the curves B1 to B3 indicate the surface temperatures of the aerial line at the section B with respect to the length direction. The curves A1 and B1 show the result of measurement of the characteristic of the temperature rise in the still low temperature state of the initial state after an elapse of 21.5 minutes from the start of the supply of the power, the curves A2 and B2 show the result of measurement of the characteristic of the temperature rise of the state during the temperature rise after an elapse of 50.1 minutes from the start of the supply of the power and where the highest temperature has not yet been reached, and the curves A3 and B3 show the result of measurement of the characteristic of the temperature rise of the state where the highest temperature has substantially been reached after an elapse of 80 minutes from the start of the supply of power.

In FIG. 10, when comparing the temperatures of the line at the winding zone A at which the heat dissipating spiral rod 10 was wound and the non-winding zone B at which it was not wound, the temperature of the aerial line in the state where the temperature of the line rose to a high temperature after the elapse of 80 minutes from the start of the supply of the power was 140° C. at the position indicated by $S_2=120$ m (vertical broken line position) measured from for example the start point $S_0$, at the non-winding zone shown by the curve B3, while was 115° C. at the position indicated by $S_1=30$ m (vertical broken line position) measured from for example the start point $S_0$ at the winding zone A, so it was confirmed that the temperature of the aerial line around which the heat dissipating spiral rod 10 was wound became lower by at least 25°. Note that, $S_1=30$ m and $S_2=120$ m indicate equal distances from the two ends of the aerial line 2 having a total length of 150 m.

In the state where the temperatures of the lines indicated by the curves A2 and B3 have not yet reached the high temperature, the temperature of the line at the vertical broken line position indicated by $S_2=120$ m at the non-winding zone B was 110° C., while the temperature of the line at the vertical broken line position indicated by $S_1=30$ m at the winding zone A was 100° C., so the temperature reduction effect thereof was 10° C. In the case of the state where the temperatures of the line indicated by the curves A1 and B1 are in the low temperature zone, the temperature of the line at the vertical broken line position indicated by $S_2=120$ m at the non-winding zone B was 70° C., while the temperature of the line at the vertical broken line position indicated by $S_1=30$ m at the winding zone A was 65° C., so the temperature reduction effect thereof was 5° C.

In this way, it was seen that the higher the surface temperature of the line, the larger the temperature reduction effect of the line by providing the spiral rod 10 on the aerial line 2, and the lower the surface temperature, the smaller the effect.

FIFTH EMBODIMENT

As a fifth embodiment of the present invention, an aerial line, aerial ground line, etc. will be given as examples of the power transmission wire equipped with a heat dissipator. A heat dissipator to be laid on an aerial line, aerial ground line, etc. (hereinafter referred to as the power transmission wire) will be given as examples of the heat dissipator for a power transmission wire.

Figure 11:
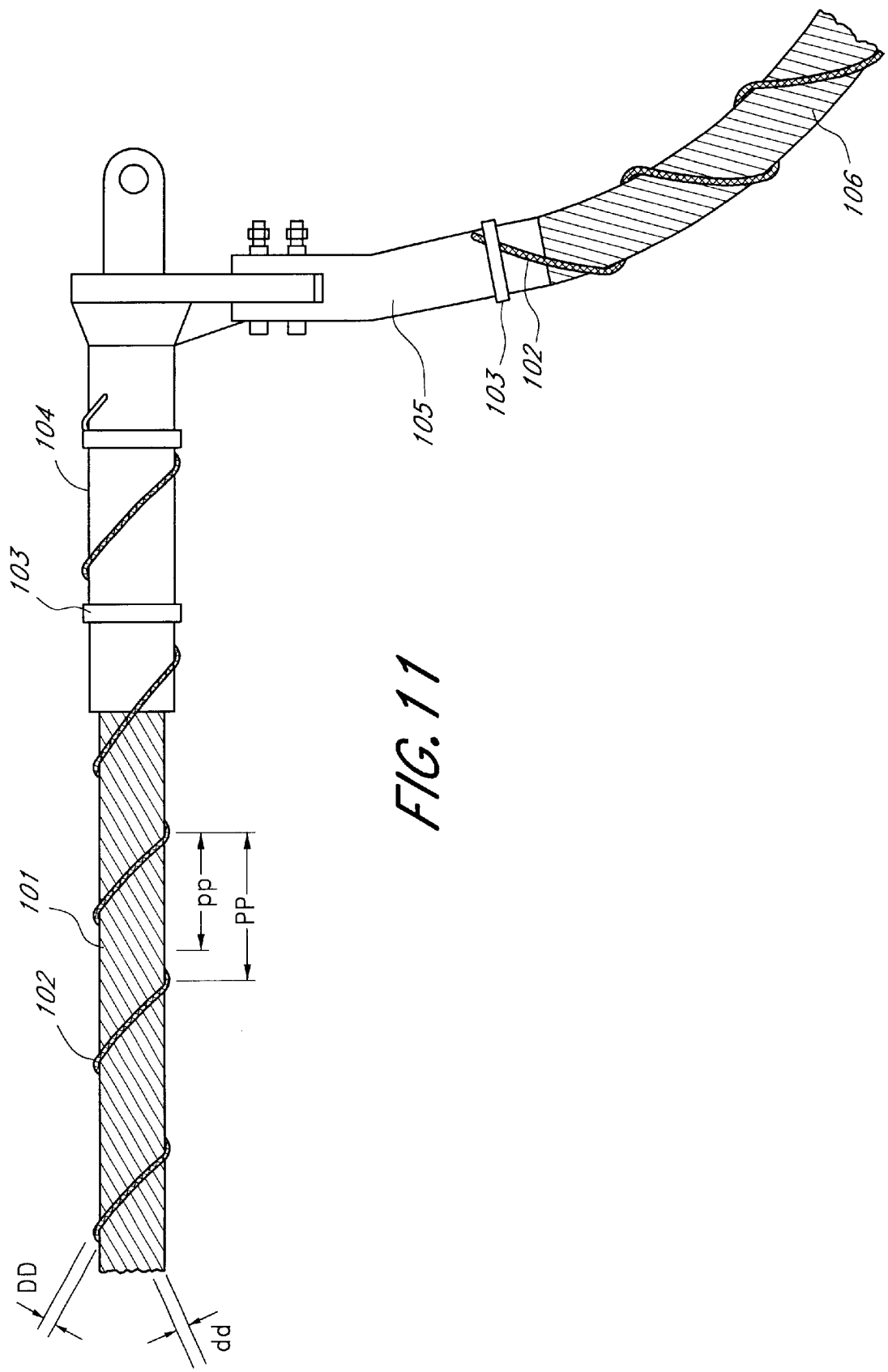
FIG. 11 is a view of the outer appearance of a fifth embodiment of the heat dissipator for a power transmission wire and the power transmission wire equipped with a heat dissipator of the present invention.
Figure 12A:
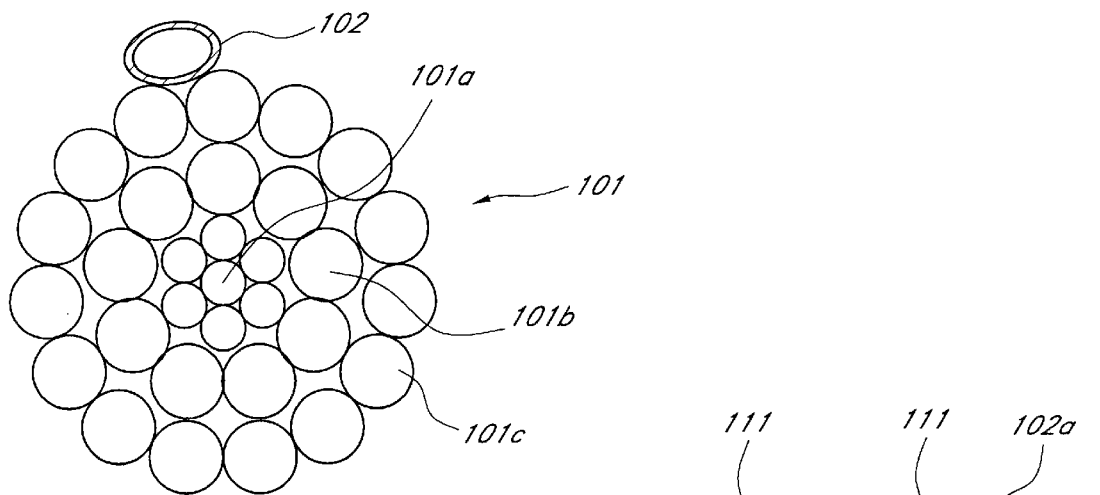
FIGS. 12A to 12C are sectional views of the aerial line and the heat dissipator used in the fifth embodiment illustrated in FIG. 11.
Figure 12B:
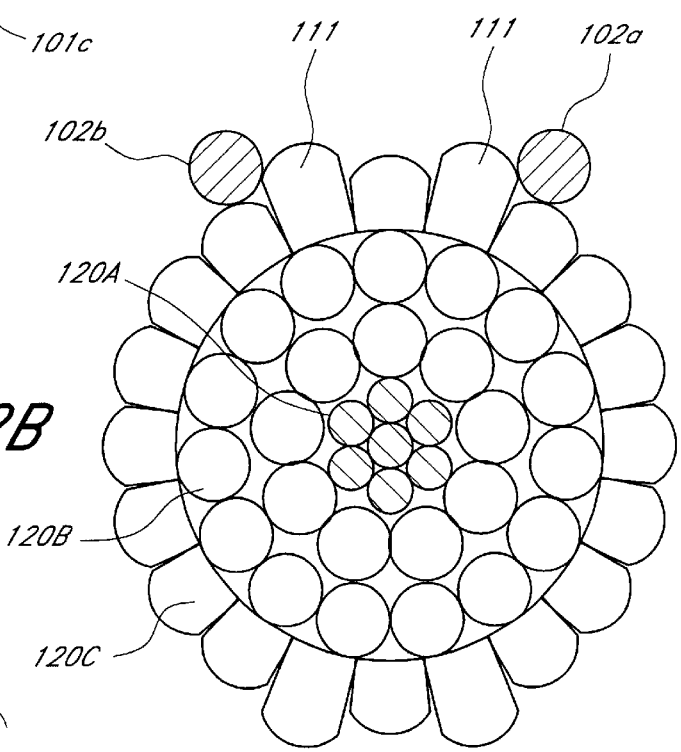
Figure 12C:
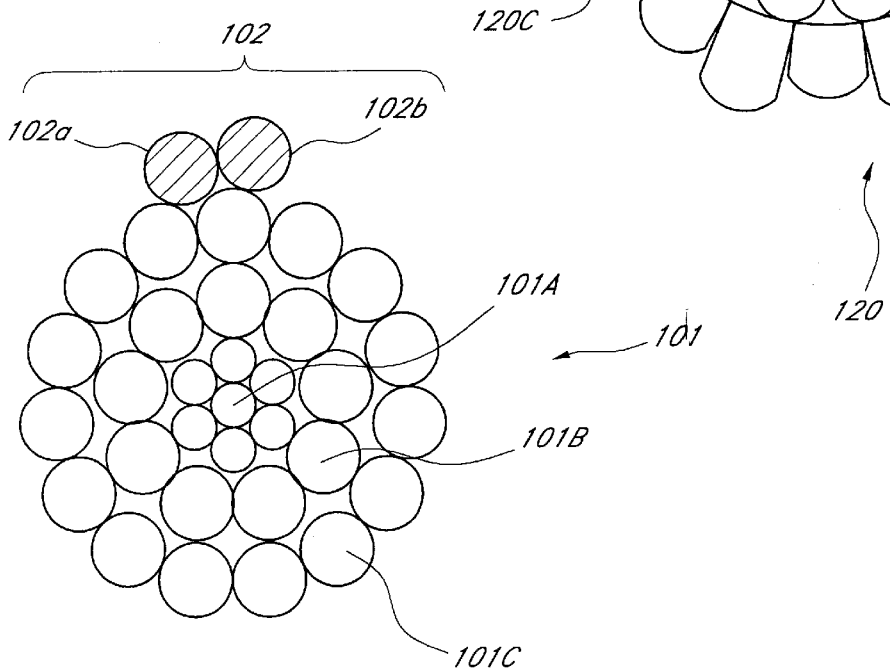

FIG. 11 is a view of the outer appearance of a heat dissipator for a power transmission wire and a power transmission wire equipped with a heat dissipator of the fifth embodiment of the present invention, FIGS. 12A to 12C are sectional views of the power transmission wire equipped with the heat dissipator illustrated in FIG. 11, and FIGS. 13A to 13E are sectional views of the heat dissipator for a power transmission wire illustrated in FIGS. 12A to 12C.

FIG. 11 particularly illustrated the case of an aerial line as a power transmission wire 101. A heat dissipator 102 is laid on the aerial line 101. The heat dissipator 102 is secured by a heat dissipator securing ring 103, while the heat dissipator securing ring 103 is secured to an anchor clamp 104. Further, the heat dissipator 102 is also laid upon a jumper 106, and the heat dissipator 102 is secured to a jumper clamp 105 by the heat dissipator securing ring 103.

A detailed description will be given of the aerial line 101 and the heat dissipator 102 next.

Example of the sectional shapes of the aerial line 101 and the heat dissipator 102 are illustrated in FIGS. 12A to 12C.

FIG. 12A shows the sectional shape in the case where a conductive heat dissipating wire of the heat dissipator 102 comprised of a rod having a hollow oval cross-section is wound around the outer circumferential surface of the aerial line 101. In this example, as the aerial line 101, the case of strands having a circular cross-section in the same way as those illustrated in FIGS. 8A and 8B was shown. The aerial line 101 comprises core strands 101A, intermediate layer strands 110B, and outer layer strands 101C. These strands 101A, 101B, and 101C are twisted in the form of a spiral along the axial direction. For example, the aerial line 101 comprises strands of steel-reinforced aluminum conductors (ACSR) having an outer diameter indicated by d=diameter of 2 to 4 mm ($\phi$2 to $\phi$4.8) twisted together as the core strands 1A. The pitch pp of twist of the outer layer strands is 40 to 90 times the outer layer strand diameter dd (pp=40 to 90 dd).

FIG. 12B shows an example of winding conductive heat dissipating wires 110a and 110b of two heat dissipators around a low noise line 120 having projecting strands 111 for lowering the noise on the outermost circumference, referred to as a "low noise aerial line", for the purpose of the lowering the noise in addition to the heat dissipation effect, disclosed in Japanese Unexamined Patent Publication (Kokai) No. 6-302223. In this case, the conductive heat dissipating wires 102a and 102b of the heat dissipators 102 are wound around the aerial line 120 at the same winding pitch as the pitch of twist of the projecting strands 111. The structure of the low noise line 120 itself is similar to that disclosed in Japanese Unexamined Patent Publication (Kokai) No. 6-302223. The conductive heat dissipating wires 102a and 102b of the heat dissipators 102 promote the heat dissipation of the low noise line 120 and lower the noise.

FIG. 12C shows the method of winding heat dissipators capable of improving the corona characteristic in addition to the heat dissipation effect. When two conductive heat dissipating wires 102a and 102b are wound around the outer circumferential surface of the aerial line 101 in close contact, the aspect ratio of the projection becomes smaller than the case of one conductive heat dissipating wire, so the electric field is reduced and the corona noise characteristic is improved. This technique applies the technique disclosed in Japanese Unexamined Patent Publication (Kokai) No. 57-98907 (Japanese Examined Patent Publication (Kokoku) No. 58-38884), but in the present embodiment, in addition to the prevention of the corona noise, the two conductive heat dissipating wires 102a and 102b having the above characteristics promote the heat dissipation of the aerial line 101. The aerial line 101 illustrated in FIG. 12C is the same as the aerial line 101 illustrated in FIG. 12A.

Of course, the aerial line 101 is not limited to the structures illustrated in FIGS. 12A to 12C and may be the aerial lines 2 illustrated in FIGS. 8A and 8B too. Further, lines having other various structures, for example, an aerial power transmission wire obtained by twisting and combining segment strands, can be applied. For example, as the power transmission wire 101, use can be made of a line obtained by superimposing a plurality of layers of strands having the same sectional area on each other, a laminate of strands having a small sectional area corresponding to the core strands 101A and strands having a large sectional area corresponding to the outer layer strands 101C, etc.

The aerial line 101 is for example comprised of steel-reinforced aluminum conductors (ACSR), steel-reinforced ultra thermo-resistant aluminum conductors (UTACSR) excellent in the thermo-resistant characteristic, Invar-reinforced super or extra thermo-resistant aluminum conductors (ZTACIR or XTACIR) excellent in thermo-resistance and having a small linear expansion coefficient, galvanized steel twisted wire used for aerial ground lines, an aerial ground line containing optical fibers, etc. For example, in the case of an aerial ground line containing optical fibers, a structure is exhibited in which the core strands 101A illustrated in FIG. 12A correspond to the optical fibers and the aerial ground line surrounds the optical fibers as the outer layer strands 101C is exhibited.

As the heat dissipator 102 laid upon the outer layer of the aerial lines 101 and 120, a single conductive heat dissipator 102 can be provided as illustrated in FIG. 12A or two same conductive heat dissipating wires 102a and 102b can be provided together as illustrated in FIGS. 12B and 12C. The individual conductive heat dissipating wires constituting the heat dissipator 2 can take various sectional shapes illustrated in FIGS. 13A to 13E, details of which will be explained later.

The conductive heat dissipating wire of the heat dissipator 102 is spirally wound around the outer circumferential surface of the power transmission wire 101 at the winding pitch PP. The heat dissipating wire of the heat dissipator 102 is wound in an open state without completely covering the outer surface of the power transmission wire 101.

By winding the heat dissipator 102, that is, the conductive heat dissipating wire wound around the outer circumference of the aerial line 101, the heat of the aerial line is conducted to the conductive heat dissipating wire. The conductive heat dissipating wire is spirally wound around the outer circumference of the aerial line 101 at a predetermined pitch and projects from the surface, therefore promotes the convection of the heat and, at the same time, effectively dissipates the heat in the aerial line 101 by the radiator effect. Further, the current also flows through the conductive heat dissipating wire, so the amount of the increase of the sectional area by this conductive heat dissipating wire increases the transmission capacity of the entire aerial line. Namely, the aerial line 101 upon which the heat dissipator 102 comprising the conductive heat dissipating wire is laid is increased in its transmission capacity as a whole.

As the method of winding the conductive heat dissipating wire of the heat dissipator 102 around the outer circumferential surface of the aerial line 101, if the conductive heat dissipating wire has a relatively short length, it is shaped into a spiral in advance and therefore can be easily wound around the aerial line 101 manually. If the conductive heat dissipating wire is made of a long wire material, it can be continuously wound around the aerial line 101 by a self-propelled robot, lashing machine, or the like. Accordingly, the conductive heat dissipating wire can be wound around aerial lines 101 by just stopping the transmission of power over all of the aerial lines and therefore can be installed in a short time. Namely, it is sufficient to just wind a conductive heat dissipating wire around an already existing aerial line 101, therefore it is not necessary to replace the already laid aerial line and consequently an increase of the transmission capacity of the aerial line can be realized in a short time economically.

As illustrated in FIGS. 12B and 12C, if two or more conductive heat dissipating wires of the aerial line 101 are wound in the longitudinal direction of the aerial line 101, the overall surface area of the conductive heat dissipating wires of the heat dissipator 102 is increased and the heat dissipation effect can be further raised. Further, the transmission capacity of the aerial line is increased.

The relationship DD/dd between the diameter (or radius) of the strands of the outermost layer of the aerial line 101 (hereinafter, referred to as the outer layer strand diameter dd of the aerial line) and the diameter of the heat dissipating wires or the thickness DD of the power transmission wire 101 in the radius direction, the relationship PP/pp between the twist pitch pp of the outermost strands of the aerial line 101 and the winding pitch PP of the dissipating wires around the power transmission wire 101, and the heat dissipation rate will be considered.

First, the heat dissipation rate will be explained. As explained also in the description of the first embodiment, the factors determining the temperature rise of the aerial line include the heat absorbed from the sun and thermal diffusion from the aerial line due to radiation of heat, but the characteristics change according to the material and the surface state of the aerial line. The factors are expressed by coefficients such as an absorption rate and the heat dissipation rate, but usually the two are not differentiated and are referred to overall as the heat dissipation rate. Below, the heat dissipation rate η will be used. The heat dissipation rate changes by a large extent according to the surface state of the aerial line. The heat dissipation rate η is 0.08 to 0.16 in a new line comprised of steel-reinforced aluminum conductors (ACSR), but the heat dissipation rate η is regarded as becoming about 0.9 on the whole when the line becomes old and the surface becomes more aged and is blackened.

The heat is conducted from the high temperature locations. In heat dissipation, one method of this heat conduction, electromagnetic waves (infrared rays) are directly radiated from the heat source. These strike another object to become heat again. Accordingly, if the rod surface is treated to blacken it in advance from the initial state like the conductive heat dissipating wire in the heat dissipator 1 so as to raise the heat dissipation rate, the rate of heat absorption from the line becomes higher and the effect of suppressing the temperature rise of the line is raised as a result.

From the above consideration, in the present embodiment as well, the surface heat dissipation rate η of the heat dissipating wire constituting the heat dissipator 102 is desirably 0.7 or more. By treating the surface of the conductive heat dissipating wire to blacken it and raise the surface heat dissipation rate to 0.7 or more, the heat of the aerial line 101 is effectively absorbed and the heat dissipation of the aerial line 101 is promoted and therefore the temperature rise of the aerial line 101 can be suppressed. Further, in comparison with a surface heat dissipation rate of about 0.1 to 0.2 like the spiral rod of the related art, if the surface of the conductive heat dissipating wire of the heat dissipator 102 of the embodiment of the present invention is treated to blacken it to raise the surface heat dissipation rate to 0.7 (4.5 to 3.0 converted to luminance) or more, there is a large effect of smoothly melting snow adhered to the surface of the aerial line.

The surface-blackening treatment of the conductive heat dissipating wire constituting the heat dissipator 102 will be explained next. In the present embodiment as well, preferably aluminum or aluminum alloy is used for the conductive heat dissipating wire. As the method of blackening the surface of the aluminum or the aluminum alloy, as explained above, for example, other than sand blasting, boehmite treatment, painting, etc., electric, chemical, and physical processes can be used. For example, in order to easily blacken the surface of aluminum heat dissipating wire, silicic acid is effective. If calcium sulfate or zinc carbonate or zinc sulfate is added to a sodium silicate solution, the surface of the conductive heat dissipating wire made of aluminum can be discolored black in a certain concentration range. If the surface of the aluminum wire material is roughened by applying sand blasting or the like before applying the blackening treatment to make the surface hydrophilic, a black surface having a high heat dissipation rate is obtained and, at the same time, an improvement of the corona noise characteristic can be achieve.

Next, the relationship between the winding pitch PP of the heat dissipator and the twist pitch pp of the outer layer strands of the aerial line and the relationship between the rod diameter DD of the heat dissipator and the outer layer strand diameter dd of the aerial line will be explained.

The relationship DD/dd between the outer layer strand diameter dd of the aerial line 101 and the diameter of the heat dissipating wire or the thickness DD of the aerial line 101 in the radial direction and the relationship PP/pp between the winding twist pitch pp of the outer layer strands of the aerial line 101 and the winding pitch PP of the heat dissipating wire around the aerial line 101 are desirably the following:

$$0.8 \leq DD/dd \leq 2.0 \tag{3}$$

$$0.8 \leq PP/pp \leq 5.0 \tag{4}$$

The reason for the relations will be explained next.

a. If $DD/dd \leq 0.8$, the diameter or height of the conductive heat dissipating wire would become small, and therefore the self winding force around the aerial line 101 would become small, so there would be an apprehension of unraveling due to vibration of the aerial line 101 or the like. If $DD/dd \geq 2.0$, the rigidity of the conductive heat dissipating wire would become too large, and, when the conductive heat dissipating wire has a short length, not only would the end of the conductive heat dissipating wire scratch the aerial line 101 at the time of winding, but also the corona noise level would be raised, so this would unsuitable in practical use. Further, when the conductive heat dissipating wire is made of a long wire material, the rigidity would become large, therefore there would be the apprehension such that the winding would no longer be able to be carried out with automatic winding by a lashing machine or the like. Further, if $DD/dd \geq 2.0$, the increase of the line tension and the increase of the wind pressure resistance after the winding of the conductive heat dissipating wire around the aerial line 101 would occur and there would be the inconvenience that the tower etc. must be reinforced or there would be a large loss in view of economy.

b. If $PP/pp \leq 0.8$, the amount of winding per unit length of the conductive heat dissipating wire would be increased. Due to the increase of the weight of the line and the increase of the wind pressure resistance after the winding, not only would there be an adverse influence exerted upon the strength of the tower, but also there would be disadvantages in view of the economy. Further, if $PP/pp \geq 5.0$, the winding member for obtaining the required heat dissipation effect would become small, and the sufficient heat dissipation effect would no longer be able to be obtained. In addition, the effect of prevention of wind noise and the prevention of accumulation of snow would be reduced.

As explained above, when relation 3 stands for DD/dd, the installation when winding the heat dissipating wire around the aerial line 101 becomes easy, the increase of the tension of the aerial line by the winding and the increase of the wind pressure load can be suppressed, and a reduction of the wind noise can be achieved. Further, when the relation 4 stands for PP/pp, the installation when winding the heat dissipating wire around the aerial line 101 is improved and a reduction of the wind noise and accumulation of snow can be achieved in relation to DD/dd.

Further preferably, the relations may be set as follows:

$$1.0 \leq DD/dd \leq 1.2 \tag{5}$$

$$1.0 \leq PP/pp \leq 2.0 \tag{6}$$

Next, various forms of the conductive heat dissipating wire constituting the heat dissipator 2 will be explained by referring to FIGS. 13A to 13E.

Figure 13A:
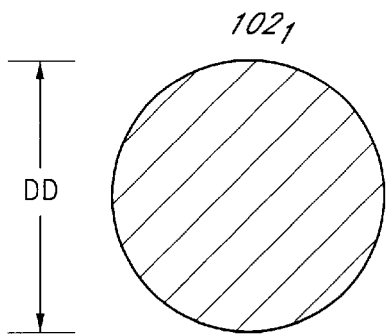
FIGS. 13A to 13E are views of the example of cross-section of the heat dissipator illustrated in FIG. 11.

The conductive heat dissipating wire $102_1$ illustrated in FIG. 13A is one having a hollow circular cross-section having a diameter of DD and most ordinarily used. The conductive heat dissipating wire $102_1$ having a circular cross-section is made of aluminum or aluminum alloy. The production of such a conductive heat dissipating wire $102_1$ is easy and also the price is cheap, therefore if such a conductive heat dissipating wire is used, it is economical. Further, it is easy to wind such a conductive heat dissipating wire $102_1$ around the aerial line 101.

Figure 13B:
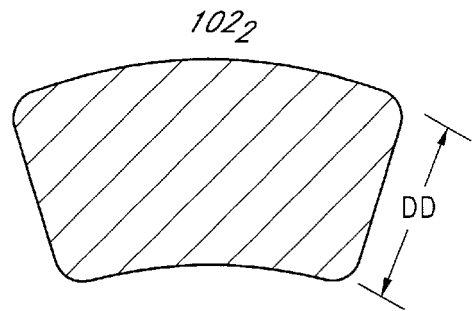

The conductive heat dissipating wire $102_2$ illustrated in FIG. 13B is a conductive heat dissipating wire having a partially fan-like (segment like) cross-section. A conductive heat dissipating wire having such a shape is effective for improving the corona characteristic by suppressing the height of projection from the surface of the aerial line 101. If it is wound around a high voltage power transmission wire, the wind pressure resistance can be reduced. Further, if such a conductive heat dissipating wire having a segment like cross-section is wound around the power transmission wire 1, the contact area with the surface of the aerial line 101 is increased and the heat dissipation effect can be raised. The segment like conductive heat dissipating wire $102_2$ is made of aluminum or aluminum alloy wire. The thickness DD thereof is equal to 4 to 5 mm in the case where for example the outer diameter of the aerial line 101 is about 38.4 mm. In the case where the aerial line 101 is a thin aerial ground line having an outer diameter of 10.5 mm and comprises seven twisted strands with diameters of the twisted strands of the outermost layer of 3.6 mm, DD is equal to about 2 mm.

Figure 13C:
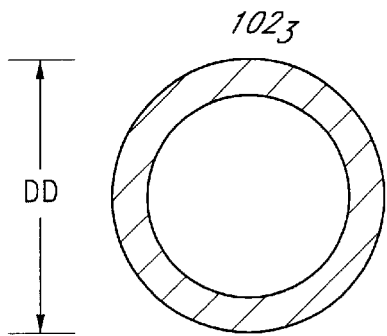

Using the hollow circular conductive heat dissipating wire $102_3$ having the diameter DD illustrated in FIG. 13C as the conductive heat dissipating wire of the heat dissipator 102 is effective when desiring to reduce the weight and keep down an increase in the line tension. Namely, if the hollow circular conductive heat dissipating wire $102_3$ is used as the heat dissipator 102, the effect of the load upon the towers etc. can be greatly reduced. The hollow circular conductive heat dissipating wire $102_3$ is comprised of aluminum or aluminum alloy wire.

Figure 13D:
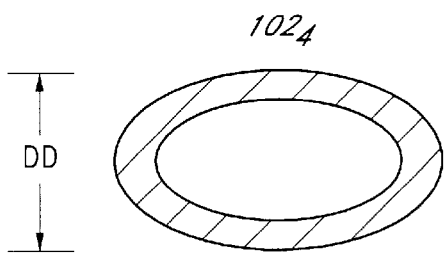

Using the hollow oval conductive heat dissipating wire $102_4$ illustrated in FIG. 13D as the conductive heat dissipating wire of the heat dissipator 102, in the same way as the hollow circular conductive heat dissipating wire $102_3$ illustrated in FIG. 13C, is effective when desiring to reduce the weight and keep down an increase in the line tension. The hollow oval conductive heat dissipating wire $102_4$ is comprised of aluminum or aluminum alloy wire.

Figure 13E:
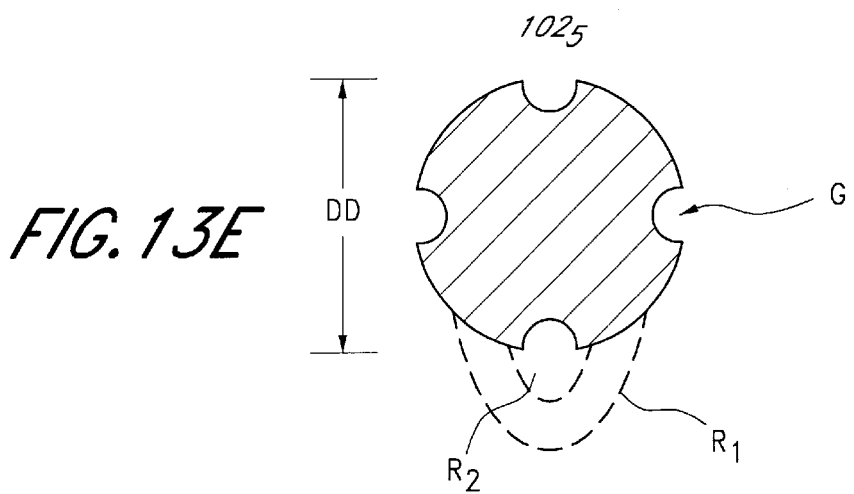

The grooved conductive heat dissipating wire $102_5$ provided with one or more grooves on the outer circumference of the circular cross-section illustrated in FIG. 13E has the effect that only small drops of water $R_1$ remain on the conductive heat dissipating wire due to the grooves G. For example, when the diameter of the conductive heat dissipating wire is relatively large, if the circular conductive heat dissipating wire $102_1$ illustrated in FIG. 13A without the grooves is used, large drops of rain $R_1$ remain at the bottom of the conductive heat dissipating wire $102_1$ at the time of rain or the like, a corona is generated with a low potential gradient (a value of an opposite sign from and an equal absolute value to the field intensity), and the corona noise becomes large. However, in the grooved conductive heat dissipating wire $102_5$ illustrated in FIG. 13E, the drops of rain concentrate along the grooves G, the water is more easily shed, and only small drops of rain $R_2$ remain, therefore the corona characteristic is improved. Further, by providing a plurality of grooves G on the surface of the conductive heat dissipating wire, even if the wire has a cross-section which is not hollow, the surface area contributing to the heat dissipation can be increased, therefore the heat dissipation characteristic becomes high. Further, the weight of the conductive heat dissipating wire can be reduced by the amount of the empty parts of the grooves. As mentioned above, by providing a plurality of grooves along the surface of the conductive heat dissipating wire, the water can be more easily shed, the formation of large drops of water is prevented, and the corona characteristic can be further improved. As the particular method of improving the corona characteristic, the conductive heat dissipating wire $102_5$ provided with a plurality of grooves is wrapped around the power transmission wire 101 in close contact with it so as to ease the surface potential gradient of the conductive heat dissipating wire equipped the plurality of grooves and further lower the corona noise level. At the same time, this also has the effect of reducting the wind noise and the amount of the accumulation of snow. Particularly, in the conductive heat dissipating wire of the present invention, as explained above, the surface heat dissipation rate was raised to 0.7 (4.4 to 3.0 converted to luminance) or more by treating the surface to blacken it, therefore there is a greater effect of smoothly melting the snow adhered to the surface of the power transmission wire 101 in comparison with one having a surface heat dissipation rate of about 0.1 to 0.2 like the spiral rod of the related art.

SIXTH EMBODIMENT

Figure 14:
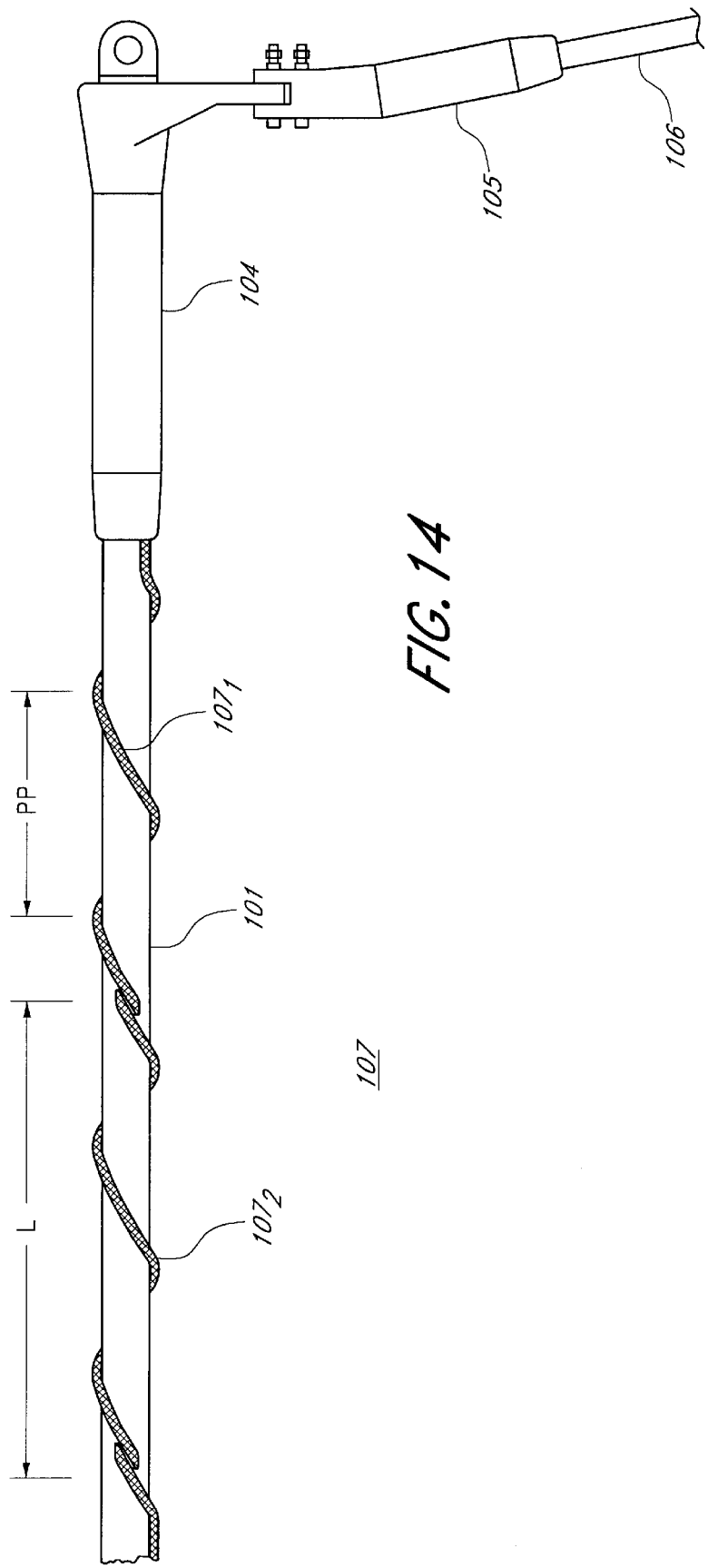
FIG. 14 is a view of the outer appearance of a sixth embodiment of the heat dissipator for a power transmission wire and the power transmission wire equipped with a heat dissipator of the present invention.

FIG. 14 is a view of the outer appearance of a heat dissipator for a power transmission wire and a power transmission wire equipped with a heat dissipator of a sixth embodiment of the present invention.

In the fifth embodiment illustrated in FIG. 11, an example in which a heat dissipator 102 using a long conductive heat dissipating wire was wound around the aerial line 101 was illustrated, but in the example illustrated in FIG. 14, a heat dissipator 107 comprising rods 71 and 72 having relatively short lengths, i.e., a length of L, and shaped in the form of open spirals in advance is continuously laid. In the heat dissipator for a power transmission wire or the power transmission wire equipped with a heat dissipator illustrated in FIG. 14, the anchor clamp 4 and the jumper clamp 5 are connected, the aerial line 101 is extended to the anchor clamp 104, and the conductive heat dissipating wires (or conductive heat dissipating rods) $107_1$ and $107_2$ having the length L are wound around the outer circumference of the aerial line 101. The jumper 106 is connected to the jumper clamp 105. The heat dissipator 107 is constituted by a plurality of such conductive heat dissipating wires $107_1$ and $107_2$.

The length L of the conductive heat dissipating wire $107_1$ desirably is 1 to 3 m since it is wound manually and this is a length that can be easily handled.

As to the sectional shape of the aerial line 101 and the arrangement of the conductive heat dissipating wires $107_1$ and $107_2$ to be wound around the aerial line 101, it is possible to use those illustrated in FIGS. 12A to 12C. As to the sectional shape of the conductive heat dissipating wires $107_1$ and $107_2$, it is possible to use the shapes of the conductive heat dissipating wires illustrated in FIGS. 13A to 13E. The material of the conductive heat dissipating wires $107_1$ and $107_2$ is preferably aluminum or aluminum alloy in the same way as the conductive heat dissipating wires explained above. The relationship between the twist pitch pp of the outer layer strands of the aerial line 101 and the outer layer strand diameter dd of the aerial line and the relationship between the winding pitch PP of the conductive heat dissipating wire $107_1$ constituting the heat dissipator 107 and the outer diameter or the thickness DD in the diametrical direction of the segment wire are similar to those of relations 3 to 6 explained in the fifth embodiment.

Accordingly, the sixth embodiment of the present invention illustrated in FIG. 14 exhibits a similar effect to that explained in the fifth embodiment except for the point that installation upon an already strung aerial line 101 is facilitated by using conductive heat dissipating wires having short lengths.

SECOND EXPERIMENTAL EXAMPLE

Figure 15:
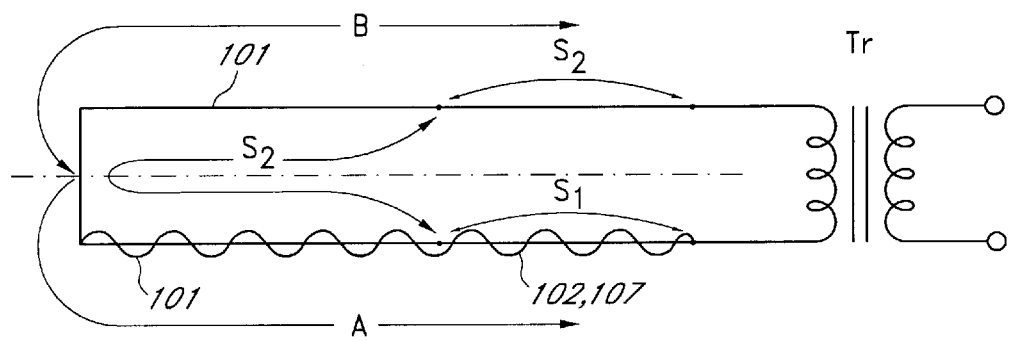
FIG. 15 is a view of the configuration of second to fourth experimental examples in the present invention.

FIG. 15 is a view of an experiment in which a constant current is passed through a part AA of the aerial line 101 upon which the above-mentioned surface-blackened heat dissipator 102, 107 is laid and a part BB of the aerial line 101 on which the heat dissipator is not laid from a transformer Tr and the surface temperature of the aerial line at the part AA and the surface temperature of the aerial line at the part BB are measured. An aerial line 101 having a length of 150 m was bent back at 75 m. The aerial line 101 at the section AA and the aerial line 101 at the section BB were laid in parallel. Steel-reinforced aluminum conductors (ACSR) were used as the aerial line 101. The sectional area of the ACSR was 410 mm$^2$, the thickness dd of the outer layer strands was 4.5 mm, and the twisting pitch pp of the outer layer strands was 290 mm. The conductive heat dissipating wire $107_1$ of the heat dissipator 107 had a thickness (diameter) DD of 6 mm and was wound at a winding pitch PP=250 mm around the aerial line (ACSR) as illustrated in FIG. 14. Accordingly, DD/dd=1.25, and PP/pp=1.0. A current of 1500 A was passed from the transmission device Tr to the power transmission wire 1. Measurements were made under an environment of a wind speed of 0.8 m/s.

Figure 16:
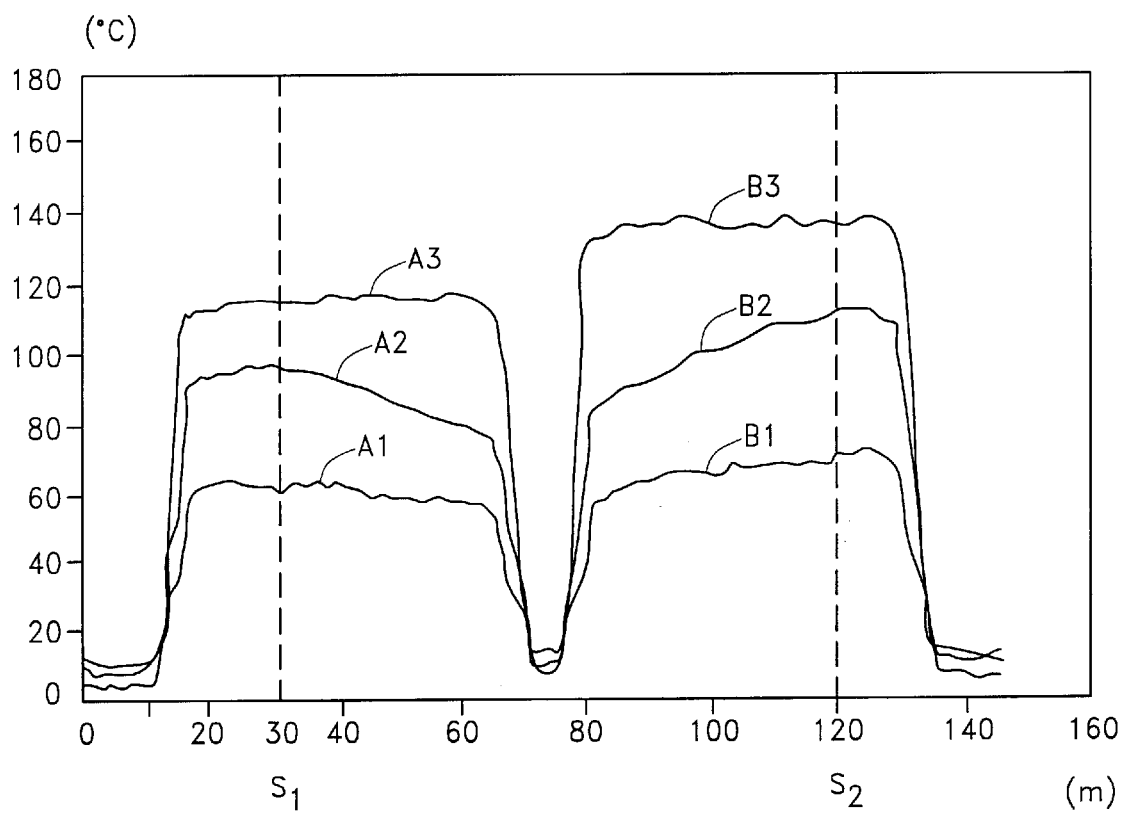
FIG. 16 is a graph of a temperature reduction effect of the aerial line as a first result of the experimental example illustrated in FIG. 15.

FIG. 16 is a graph of the results of the experiment illustrated in FIG. 15. The abscissa indicates the length (m) of the aerial line, and the ordinate indicates the surface temperature (° C.) of the aerial line. The curves AA1 to AA3 indicate the surface temperatures of the aerial line in the section AA with respect to the length direction, while the curves BB1 to BB3 indicate the surface temperatures of the aerial line in the section BB with respect to the length direction. The curves AA1 and BB1 show the result of measurement of the temperature rise characteristic after the elapse of 21.5 minutes from the start of the supply of power, the curves AA2 and BB2 show the result of measurement of the temperature rise characteristic after an elapse of 50.1 minutes from the start of the supply of power and where the highest temperature has not yet been reached, and the curves AA3 and BB3 show the result of measurement of the temperature rise characteristic after the elapse of 80 minutes from the start of the supply of power.

As illustrated in FIG. 15, the distance $S_1$=30 m and the distance $S_2$=120 m are distances equal from the two ends of the aerial line 101. When comparing the curve AA3 and the curve BB3 at these positions, the surface temperature of the aerial line around which the conductive heat dissipating wire is not wound was 140° C. as indicated by the curve BB3, while the surface temperature of the aerial line around which the conductive heat dissipating wire is wound was 115° C. as indicated by the curve AA1. When comparing the two, a reduction of the surface temperature of 25 degrees was obtained by providing the heat dissipator 107.

The temperature reduction effect of the heat dissipator 107 becomes more conspicuous as the temperature becomes higher. For example, the temperature difference between the curve AA1 and the curve BB1 at the distance $S_1$=30 m and the distance $S_2$=120 m was 5° C., the temperature difference between the curve AA2 and the curve BB2 was 10° C., and the temperature difference between the curve AA3 and the curve BB3 was 25° C.

As described above, by winding the heat dissipators 102 and 107 around the power transmission wire 101, it is possible to promote the heat dissipation of the aerial line 101 and lower the temperature of the aerial line 101. The reduction of the temperature of the aerial line also leads to a reduction of the increase of the sag of the aerial line.

The higher the temperature of the aerial line, the more remarkable the temperature reduction effect by the winding of the heat dissipators 102 and 107 around the aerial line.

By winding a plurality of conductive heat dissipating wires around the aerial line, the temperature reduction effect becomes more remarkable.

THIRD EXPERIMENTAL EXAMPLE

Figure 17:
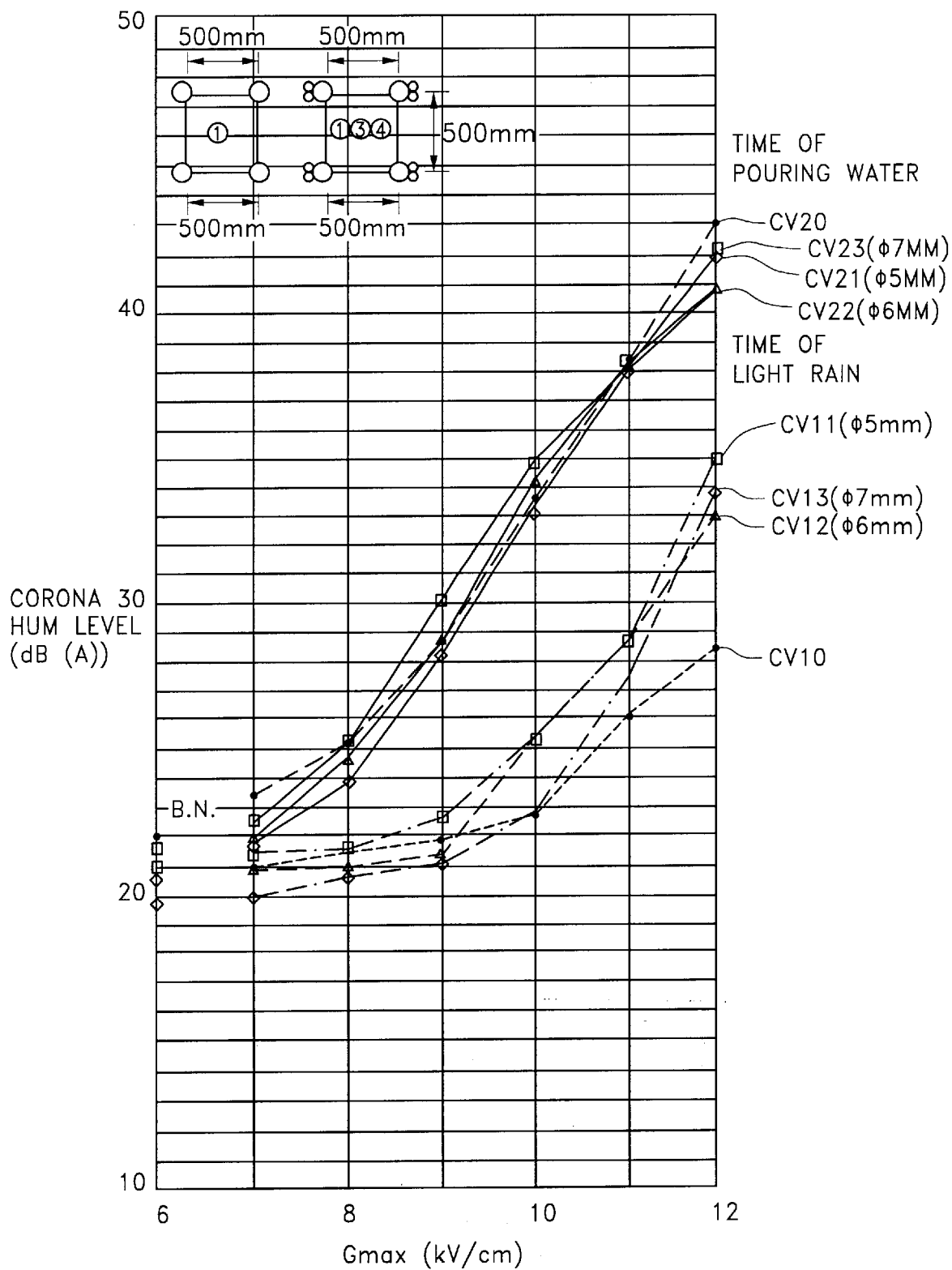
FIG. 17 is a graph of a corona hum characteristic of the aerial line as a second result of the experimental example illustrated in FIG. 15.

FIG. 17 is a graph of the corona noise characteristic at the time of pouring water and at the time of a light rain for the case where heat dissipators are attached to power transmission wires and the case where they are not attached to power transmission wires.

Four aerial lines 101 comprised steel-reinforced aluminum conductors (ACSR) of 810 mm$^2$ sectional area (space between lines=500 mm square, d=4.8 mm, p=410 mm) were used. When winding conductive heat dissipating wires around the aerial lines, two conductive heat dissipating wires were attached to the four lines in close contact. The winding pitch P of the conductive heat dissipating wires of the heat dissipators 107 around the aerial lines was set to a constant 350 mm, and the diameter D of the conductive heat dissipating wires was changed to three types, that is, $\phi 5$, $\phi 6$, and $\phi 7$ for the measurement. The ordinate of FIG. 17 indicates the corona hum level (dB(A)), while the abscissa indicates the maximum potential gradient (kV/cm).

The "time of pouring water" means the time of rainfall of 30 mm/h, while the "time of light rain" means the time of a light rain equivalent to 3 mm/h.

The characteristic in the case of light rain when conductive heat dissipating wires are not wound around the aerial line 101 is indicated by a curve CV10 comprised of the broken line connecting the black dots, while the characteristic in the case of pouring water is indicated by a curve CV20 comprised of the broken line connecting the black dots. The characteristics in the case of light rain when conductive heat dissipating wires having diameters D of $\phi 5$, $\phi 6$, and $\phi 7$ are wound around the outer circumferential surfaces of the aerial lines 101 are indicated by the curves CV11 to CV13, while the characteristics in the case of pouring water are indicated by the curves CV21 to CV23.

Viewed as a whole, the corona hum is larger at the time of pouring water than at the time of light rain.

The maximum potential gradient of an ultra high pressure aerial line of 500 kV is usually about 11 to 12 kV/cm, though depending on the mounting design, therefore when compared with this value, the corona hum characteristic naturally is a better value in the case where heat dissipators are not attached to the aerial lines 101. The deterioration of the characteristic due to the attachment of the heat dissipators to the aerial lines 101 becomes worse as the diameter become thinner, but the difference is about several dB(A) at most. The difference is 1.5 to 3 dB(A) in comparison with the case where heat dissipators are not attached to the aerial lines 101 and therefore is a value not causing any problem. Namely, it was seen that the corona noise was not largely increased even if the heat dissipators of the present embodiment projecting from the outer surface of the aerial lines were attached on the aerial lines.

Note that, the term "mounting design" means, in the design of the tower holding the power transmission wires, the design of the vertical space and horizontal space between arms of the tower based on design specifications in order to maintain the transmission voltage or the predetermined insulation intervals in areas with strong winds, areas with icing, etc.

FOURTH EXPERIMENTAL EXAMPLE

Figure 18:
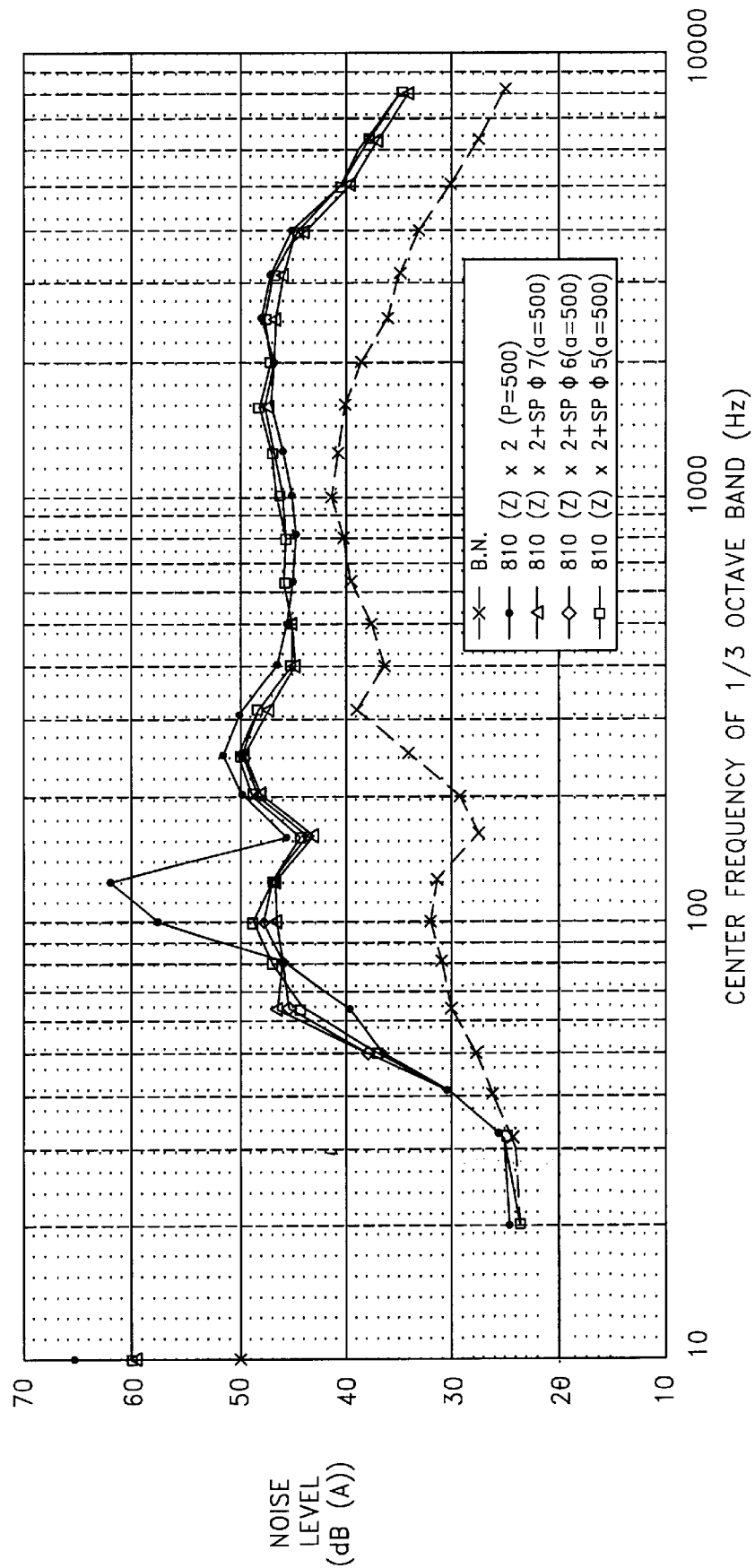
FIG. 18 is a graph of a wind noise characteristic of the aerial line as a third result of the experimental example illustrated in FIG. 15.

FIG. 18 is a graph of the results of measurement of the wind noise level under the conditions of aerial lines and heat dissipators the same as those of FIG. 17.

Two aerial lines 101 comprised of steel-reinforced aluminum conductors (ACSR) of a sectional area of 810 mm$^2$ (space between lines=500 mm square, d=4.8 mm, p=410 mm) was used. Conductive heat dissipating wires were attached to the conductors of the two aerial lines. The two lines were placed in a wind tunnel with their centers positioned 1 m from the blowing port, then the wind noise level was measured at a wind speed of 20 m/s.

The curve connecting the black dots shows the result of measurement of the wind noise in the case where the conductive heat dissipating wires are not attached. The curve connecting the triangles shows the result of measurement of the wind noise in the case where conductive heat dissipating wires of $\phi 7$ are wound around the power transmission wire, the curve connecting the diamonds shows the result of measurement of the wind noise in the case where conductive heat dissipating wires of $\phi 6$ are wound around the aerial lines, and the curve connecting squares shows the result of measurement in the case where conductive heat dissipating wires of $\phi 5$ are wound around the power transmission wires.

Note that, in the figure, BN indicates the "background noise" and is given for comparison.

When heat dissipators 102 are not attached to the aerial lines, an outstanding frequency giving the maximum wind noise value of 62 dB(A) appears in the vicinity of 125 Hz. This becomes the cause of the wind noise. Particularly, this noise has a low frequency, and dull sound, so the attenuation over a distance is small and the noise can be heard at a far place. Accordingly, this frequently causes complaints about noise. It was confirmed that if heat dissipators were attached, the outstanding frequency disappeared, the noise level at the peak frequency was greatly reduced to 13 to 16 dB(A), and the sound almost completely disappeared and that therefore the noise level could be suppressed to a sufficiently low level that did not cause complaints about noise.

Note that, the term "outstanding frequeny" means the frequency giving the maximum noise level and is expressed by f=S×v/D (Hz), where S is the Strohall number and is approximately equal to 0.185 to 2.1, V is the wind speed (m/s), and D is the outer diameter (m) of the aerial line.

Regarding the influence of the diameter of a heat dissipator upon the noise level, a conductive heat dissipating wire of $\phi 7$ is excellent (curve connecting triangles), but there is a sufficient effect even by a conductive heat dissipating wire having a diameter less than this. When considering the installation, economy, the previous corona hum characteristic, etc. together, even a conductive heat dissipating wire having a diameter of $\phi 5$ sufficiently satisfies the performance requirements.

The heat dissipator of the present invention may not only be applied to already strung aerial lines as shown in the embodiments, but also to newly strung power transmission wires. In order to increase the capacity, in the case of newly strung lines, it is possible to artificially age the surface in advance by sand blasting or boehmite treatment or other electrical and chemical treatment methods to raise the surface heat dissipation rate so as to obtain a surface heat dissipation rate comparable to that of a naturally aged aerial line immediately after laying it and therefore more effectively increase the capacity.

While the above description was mainly made of the case where the heat dissipator of the present invention was applied to a single line (one power transmission wire), the present invention can also be applied to the case of multiple lines, for example, two, three, four, six, eight, 10, and other lines in the same way as that explained above. In this case, spacers are attached to the multiple power transmission wires at intervals of 20 to 70 m. It is possible to stop winding the heat conducting heat dissipators in the vicinity of the clamps of the spacers or to modify the clamps so as to grip the heat dissipators from the top together. Such a means can be appropriately selected and executed according to the particular situation.

CAPABILITY OF UTILIZATION IN INDUSTRY

The heat dissipator for a power transmission wire of the present invention explained above can be utilized for the purpose of the heat dissipation of an aerial line and, as a result of this, can increase the transmission capacity of an aerial power transmission wire.

Further, a power transmission wire equipped with a heat dissipator provided with a heat dissipator can be used for an aerial line and other power transmission wires.

What is claimed is:

1. A heat dissipator for a power transmission wire comprised of a conductive heat dissipation member having conductivity and having a surface heat dissipation rate of 0.7 or more spirally wound around the outer circumferential surface of the power transmission wire at a predetermined winding pitch in close contact thereto.

2. A heat dissipator for a power transmission wire as set forth in claim 1, wherein the conductive heat dissipation member is treated to blacken its surface and delustered.

3. A heat dissipator for a power transmission wire as set forth in claim 1, wherein the surface of the conductive heat dissipation member is treated to make it hydrophilic.

4. A heat dissipator for a power transmission wire as set forth in claim 1, wherein the conductive heat dissipation member has a surface which is artificially or naturally aged in advance.

5. A heat dissipator for a power transmission wire as set forth in claim 1, wherein the conductive heat dissipation member is produced by aluminum or an aluminum alloy.

6. A heat dissipator for a power transmission wire as set forth in claim 1, wherein the conductive heat dissipation member of the heat dissipator for a power transmission wire has a conductive, surface-blackened heat dissipating spiral rod having a surface heat dissipation rate of 0.7 or more spirally formed in the longitudinal direction so that it can be attached on the outer circumferential surface of the power transmission wire in close contact thereto and the spiral rod is spirally wound around the outer circumferential surface of the power transmission wire at a predetermined winding pitch.

7. A heat dissipator for a power transmission wire as set forth in claim 6, wherein a winding pitch p of the surface-blackened heat dissipating spiral rod is set within the following range with respect to the outer diameter D of the power transmission wire:

$10D \leq p \leq 30D$.

8. A heat dissipator for a power transmission wire as set forth in claim 6, wherein the surface-blackened heat dissipating spiral rod is wound around the outer circumferential surface of a jumper at the tension support of the power transmission wire.

9. A heat dissipator for a power transmission wire as set forth in claim 1, wherein
a conductive heat dissipation member of the heat dissipator for a power transmission wire has a surface-blackened conductive heat dissipation member which is flexible, electrically conductive, and has a surface heat dissipation rate of 0.7 or more to be attached on the outer circumferential surface of the power transmission wire in close contact thereto, and
the conductive heat dissipation member is spirally wound around the outer circumferential surface of the power transmission wire at a predetermined winding pitch.

10. A heat dissipator for a power transmission wire as set forth in claim 9, wherein when the strand diameter of the outermost layer of the power transmission wire is dd, the outer diameter of the surface-blackened conductive heat dissipation member or the thickness in the diameter direction is DD, the pitch of the twist of the strand of the outer layer of the power transmission wire is pp, and the winding pitch of the conductive heat dissipation member around the outer circumferential surface of the power transmission wire is PP, the following relations stand:

$0.8 \leq DD/dd \leq 2.0$, and $0.8 \leq PP/pp \leq 5.0$.

11. A heat dissipator for a power transmission wire as set forth in claim 9, wherein when the strand diameter of the outermost layer of the power transmission wire is dd, the outer diameter of the surface-blackened conductive heat dissipation member or the thickness of the diameter direction is DD, the pitch of the twist of the strand of the outer layer of the power transmission wire is pp, and the winding pitch of the conductive heat dissipation member around the outer circumferential surface of the power transmission wire is PP, the following relations stand:

$1.0 \leq DD/dd \leq 1.2$, and $1.0 \leq PP/pp \leq 2.0$.

12. A heat dissipator for a power transmission wire as set forth in claim 9, wherein the cross-section of the conductive heat dissipating member is circular.

13. A heat dissipator for a power transmission wire as set forth in claim 9, wherein the cross-section of the conductive heat dissipating member is a partially fan-like segment.

14. A heat dissipator for a power transmission wire as set forth in claim 9, wherein the cross-section of the conductive heat dissipating member is a hollow circle.

15. A heat dissipator for a power transmission wire as set forth in claim 9, wherein the cross-section of the conductive heat dissipating member is a hollow oval.

16. A heat dissipator for a power transmission wire as set forth in claim 9, wherein a groove for suppressing the formation of drops of water is formed along the circumference of the conductive heat dissipating member having a circular cross-section.

17. A heat dissipator for a power transmission wire as set forth in claim 9, wherein a winding pitch p of the surface-blackened heat dissipating spiral rod around the power transmission wire is set to the following range with respect to the outer diameter D of the power transmission wire:

$10D \leq p \leq 30D$.

18. A heat dissipator for a power transmission wire as set forth in claim 9, wherein the surface-blackened heat dissipating spiral rod is wound around the outer circumferential surface of the jumper at a tension support of the power transmission wire.

19. A heat dissipator for a power transmission wire comprised of a conductive heat dissipation member having conductivity and having a surface heat dissipation rate of 0.7 or more spirally wound around the outer circumferential surface of the power transmission wire at a predetermined winding pitch in close contact thereto, wherein the conductive heat dissipation member is a braided heat conducting wire heat dissipating belt comprised of heat conducting metal strands braided in the form of a mesh belt.

20. A heat dissipator for a power transmission wire as set forth in claim 19, wherein the braided heat conducting wire heat dissipating belt has a winding pitch giving a center angle θ of the winding width on the circumference of the cross-section of the power transmission wire with the center of the power transmission wire defined by the following relation:

$15° \leq \theta \leq 180°$.

21. A heat dissipator for a power transmission wire as set forth in claim 19, wherein a winding pitch p of the braided heat conducting wire heat dissipating belt around the power transmission wire is set within the following range with respect to an outer diameter D of the power transmission wire:

$10D \leq p \leq 30D$.

22. A heat dissipator for a power transmission wire as set forth in claim 6, wherein a spiral rod is wound on the braided heat conducting wire heat dissipating belt wound around the outer circumferential surface of the power transmission wire in a reverse direction to the winding direction of the braided heat conducting wire heat dissipating belt to secure the winding of the braided heat conducting wire heat dissipating belt.

23. A heat dissipator for a power transmission wire as set forth in claim 19, wherein the heat conducting metal strand of the braided heat conducting wire heat dissipating belt is a wire made of aluminum or an aluminum alloy having a diameter of 0.3 mm to 3.0 mm.

24. A heat dissipator for a power transmission wire as set forth in claim 19, wherein a plurality of the braided heat conducting wire heat dissipating belts are wound around the outer circumferential surface of the power transmission wire in the same direction or so as to cross.

25. A heat dissipator for a power transmission wire as set forth in claim 19, wherein an end of the braided heat conducting wire heat dissipating belt wound around the outer circumferential surface of the power transmission wire is wound around a front end of an anchor clamp to secure it.

26. A heat dissipator for a power transmission wire as set forth in claim 19, wherein a braided heat conducting wire heat dissipating belt comprised of a heat conducting metal strand braided in the form of a mesh belt is wound around the outer circumference of a jumper at a tension support of the power transmission wire, and the end of the braided belt member is wound around the front end of a jumper connection of the anchor clamp to secure it.

27. A power transmission wire having a heat conducting and dissipating means comprised of a conductive heat dissipation member having conductivity and a surface heat dissipation rate of 0.7 or more spirally wound around the outer circumferential surface at a predetermined winding pitch in close contact thereto.

28. A power transmission wire as set forth in claim 27, wherein the conductive heat dissipation member is treated to blacken its surface and delustered.

29. A power transmission wire as set forth in claim 27, wherein the surface of the conductive heat dissipation member is treated to make it hydrophilic.

30. A power transmission wire as set forth in claim 27, wherein the conductive heat dissipation member has a surface which is artificially or naturally aged in advance.

31. A power transmission wire as set forth in claim 27, wherein the conductive heat dissipation member is produced from aluminum or an aluminum alloy.

32. A power transmission wire as set forth in claim 27, wherein the power transmission wire is produced from any of steel-reinforced aluminum conductors (ACSR), steel-reinforced ultra thermo-resistant aluminum alloy conductors (UTACSR), Invar-reinforced super or extra thermo-resistant aluminum alloy conductors (ZTACIR or XTACIR), and galvanized steel twisted wire.

33. A power transmission wire having a heat conducting and dissipating means comprised of a conductive heat dissipation member having conductivity and a surface heat dissipation rate of 0.7 or more spirally wound around the outer circumferential surface at a predetermined winding pitch in close contact thereto, wherein the conductive heat dissipation member is a braided heat conducting wire heat dissipating belt comprised of a heat conducting metal strand braided in the form of a mesh belt.

34. A power transmission wire as set forth in claim 33, wherein a plurality of braided heat conducting wire heat dissipating belts are wound around the outer circumferential surface of the power transmission wire in close contact thereto in the same direction or so as to cross.

35. A power transmission wire as set forth in claim 27, wherein the conductive heat dissipation member is a conductive, surface-blackened heat dissipating spiral rod having a surface heat dissipation rate of 0.7 or more formed spirally in the longitudinal direction so that it can be attached to the outer circumferential surface of the power transmission wire in close contact thereto.

36. A power transmission wire as set forth in claims 27, wherein the conductive heat dissipation member is a surface-blackened conductive heat dissipation member which is flexible, electrically conductive, and has a surface heat dissipation rate of 0.7 or more to be attached on the outer circumferential surface of the power transmission wire in close contact thereto.

37. A method of attaching a heat dissipator on a power transmission wire comprising spirally winding a heat dissipation member having conductivity and a surface heat dissipation rate of 0.7 or more around the outer circumferential surface of an aerial line in close contact thereto at a predetermined winding pitch.

38. A method of attaching a heat dissipator as set forth in claim 37, wherein the attachment work is carried out while transmitting power through the power transmission wire.

39. A method of attaching a heat dissipator as set forth in claim 37, wherein the conductive heat dissipation member is produced from aluminum or an aluminum alloy.

40. A method of attaching a heat dissipator as set forth in claim 37, wherein the conductive heat dissipation member is a conductive, surface-blackened heat dissipating spiral rod having a surface heat dissipation rate of 0.7 or more spirally formed in the longitudinal direction so that it can be attached to the outer circumferential surface of the power transmission wire in close contact thereto.

41. A method of attaching a heat dissipator as set forth in claim 40, wherein a winding pitch p of the surface-blackened heat dissipating spiral rod around the power transmission wire is set to the following range with respect to the outer diameter D of the power transmission wire:

$$10D \leq p \leq 30D.$$

42. A method of attaching a heat dissipator as set forth in claim 37, wherein the conductive heat dissipation member is a surface-blackened conductive heat dissipation member which is flexible, electrically conductive, and has a surface heat dissipation rate of 0.7 or more to be attached at the outer circumferential surface of the power transmission wire in close contact thereto.

43. A method of attaching a heat dissipator as set forth in claim 42, wherein when the strand diameter of the outermost layer of the power transmission wire is dd, the outer diameter of the surface-blackened conductive heat dissipation member or the thickness of the diameter direction is DD, the pitch of the twist of the strand of the outer layer of the power transmission wire is pp, and the winding pitch of the conductive heat dissipation member around the outer circumferential surface of the power transmission wire is PP, the following relations stand:

$$0.8 \leq DD/dd \leq 2.0,$$

and $$0.8 \leq PP/pp \leq 5.0.$$

44. A method of attaching a heat dissipator as set forth in claim 42, wherein when the strand diameter of the outermost layer of the power transmission wire is dd, the outer diameter of the surface-blackened conductive heat dissipation member or the thickness of the diameter direction is DD, the pitch of the twist of the strand of the outer layer of the power transmission wire is pp, and the winding pitch of the conductive heat dissipation member around the outer circumferential surface of the power transmission wire is PP, the following relations stand:

$$1.0 \leq DD/dd \leq 1.2,$$

and $$1.0 \leq PP/pp \leq 2.0.$$

45. A method of attaching a heat dissipator on a power transmission wire comprising spirally winding a heat dissipation member having conductivity and a surface heat dissipation rate of 0.7 or more around the outer circumferential surface of an aerial line in close contact thereto at a predetermined winding pitch, wherein the conductive heat dissipation member is a braided heat conducting wire heat dissipating belt comprised of a heat conducting metal strand braided in the form of a mesh belt.

46. A method of attaching a heat dissipator as set forth in claim 45, wherein the braided heat conducting wire heat dissipating belt has a winding pitch giving a center angle θ of the winding width on the circumference of the cross-section of the power transmission wire with the center of the power transmission wire defined by the following relation:

$$15°≤θ≤180°.$$

47. A method of attaching a heat dissipator as set forth in claim 45, wherein a winding pitch p of the braided heat conducting wire heat dissipating belt around the power transmission wire is set within the following range with respect to an outer diameter D of the power transmission wire:

$$10D≤p≤30D.$$

48. A method of attaching a heat dissipator as set forth in claim 45, wherein a plurality of the braided heat conducting wire heat dissipating belts are wound around the outer circumferential surface of the power transmission wire in the same direction or so as to cross.

* * * * *

UNITED STATES PATENT AND TRADEMARK OFFICE
CERTIFICATE OF CORRECTION

PATENT NO.    : 6,369,328 B1
DATED         : April 9, 2002
INVENTOR(S)   : Takeo Munakata It is certified that error appears in the above-identified patent and that said Letters Patent is hereby corrected as shown below:

Column 32,
Line 46, please delete "6" and insert therefore, -- 19 --.

Signed and Sealed this

Twenty-first Day of January, 2003

JAMES E. ROGAN
*Director of the United States Patent and Trademark Office*